(12) United States Patent
Tarlazzi et al.

(10) Patent No.: US 9,787,385 B2
(45) Date of Patent: Oct. 10, 2017

(54) DISTRIBUTED ANTENNA SYSTEM FOR MIMO SIGNALS

(71) Applicant: Andrew Wireless Systems GmbH, Buchdorf (DE)

(72) Inventors: Luigi Tarlazzi, Bagnacavallo (IT); Samuele Brighenti, Faenza (IT); Pier Faccin, Savingnano (IT)

(73) Assignee: Andrew Wireless Systems GmbH, Buchdorf (DE)

(*) Notice: Subject to any disclaimer, the term of this patent is extended or adjusted under 35 U.S.C. 154(b) by 0 days.

(21) Appl. No.: 14/936,208

(22) Filed: Nov. 9, 2015

(65) Prior Publication Data

US 2016/0065293 A1   Mar. 3, 2016

Related U.S. Application Data

(63) Continuation of application No. 13/794,416, filed on Mar. 11, 2013, now Pat. No. 9,184,962, which is a
(Continued)

(30) Foreign Application Priority Data

Dec. 1, 2010 (IT) .................................. 2010A0714

(51) Int. Cl.
*H04B 10/00* (2013.01)
*H04B 7/06* (2006.01)
(Continued)

(52) U.S. Cl.
CPC ........... *H04B 7/0682* (2013.01); *H04B 7/024* (2013.01); *H04B 7/0413* (2013.01);
(Continued)

(58) Field of Classification Search
USPC .................................................. 398/115–118
See application file for complete search history.

(56) References Cited

U.S. PATENT DOCUMENTS 3,665,316 A   5/1972   Jeffers
3,740,756 A * 6/1973   Sosin ....................... H01Q 3/24
                                                    330/53
(Continued)

FOREIGN PATENT DOCUMENTS

CN   1523371 A   8/2004
CN   1524390     8/2004
(Continued)

OTHER PUBLICATIONS

Chinese Patent Office, "Decision to Grant for CN Application No. 201180064589.6", "from Foreign Counterpart to U.S. Appl. No. 12/634,212", Jun. 7, 2016, pp. 1-3, Published in: CN.
(Continued)

*Primary Examiner* — Agustin Bello
(74) *Attorney, Agent, or Firm* — Fogg & Powers LLC

(57) ABSTRACT

A distributed antenna system includes a multiple-input and multiple-output (MIMO) base station configured to output at least a first signal and a second signal. At least one master unit communicates with the MIMO base station. At least one remote unit communicates with the master unit. At least one antenna is coupled with the remote unit for receiving signals from the remote unit. A coupler element is configured for introducing a phase shift in a portion of at least the first MIMO signal and for combining the phase shifted first MIMO signal portion with a portion of the second MIMO signal and presenting the combined first and second MIMO signal portions at an output port of the coupler element. An antenna is configured for receiving the combined MIMO signal portions for transmission.

22 Claims, 14 Drawing Sheets

Related U.S. Application Data continuation-in-part of application No. 12/634,212, filed on Dec. 9, 2009, now Pat. No. 8,396,368, and a continuation of application No. PCT/US2011/062640, filed on Nov. 30, 2011.

(51) Int. Cl.

| | | |
|---|---|---|
| *H04B 7/024* | (2017.01) | |
| *H04B 7/0452* | (2017.01) | |
| *H04W 88/08* | (2009.01) | |
| *H04B 7/0413* | (2017.01) | |
| *H04J 14/02* | (2006.01) | |
| *H04L 5/14* | (2006.01) | |
| *H04L 27/20* | (2006.01) | |

(52) U.S. Cl.
CPC .......... *H04B 7/0452* (2013.01); *H04J 14/028* (2013.01); *H04J 14/0247* (2013.01); *H04J 14/0252* (2013.01); *H04J 14/0298* (2013.01); *H04L 5/14* (2013.01); *H04L 27/20* (2013.01); *H04W 88/085* (2013.01); *H04J 14/0254* (2013.01)

(56) References Cited

U.S. PATENT DOCUMENTS

| | | | |
|---|---|---|---|
| 3,778,716 A | 12/1973 | Stokes | |
| 3,898,566 A | 8/1975 | Switzer et al. | |
| 4,010,474 A | 3/1977 | Provencher | |
| 4,092,596 A | 5/1978 | Dickinson et al. | |
| 4,213,132 A * | 7/1980 | Davidson | H01Q 25/00 342/350 |
| 4,238,779 A | 12/1980 | Dickinson et al. | |
| 4,584,582 A | 4/1986 | Munger | |
| 4,615,040 A | 9/1986 | Mojoli et al. | |
| 4,709,418 A | 11/1987 | Fox et al. | |
| 4,763,317 A | 8/1988 | Lehman et al. | |
| 4,827,270 A * | 5/1989 | Udagawa | H01Q 19/17 333/116 |
| 4,849,811 A | 7/1989 | Kleinerman | |
| 4,949,340 A | 8/1990 | Smith et al. | |
| 5,025,485 A * | 6/1991 | Csongor | H04B 7/2045 342/356 |
| 5,153,763 A | 10/1992 | Pidgeon | |
| 5,239,667 A | 8/1993 | Kanai | |
| 5,248,984 A | 9/1993 | Sezai | |
| 5,263,175 A | 11/1993 | Dejmek | |
| 5,428,817 A * | 6/1995 | Yahagi | H04W 16/06 455/129 |
| 5,444,697 A | 8/1995 | Leung et al. | |
| 5,519,735 A | 5/1996 | Rice et al. | |
| 5,627,879 A | 5/1997 | Russell et al. | |
| 5,657,374 A | 8/1997 | Russell et al. | |
| 5,715,275 A | 2/1998 | Emi | |
| 5,719,867 A | 2/1998 | Borazjani | |
| 5,745,858 A * | 4/1998 | Sato | H01Q 3/2605 455/138 |
| 5,774,789 A | 6/1998 | van der Kaay et al. | |
| 5,805,575 A | 9/1998 | Kamin, Jr. | |
| 5,854,986 A * | 12/1998 | Dorren | H01Q 1/246 455/103 |
| 5,867,292 A * | 2/1999 | Crimmins | H04B 10/1149 398/100 |
| 5,881,095 A | 3/1999 | Cadd | |
| 5,930,231 A | 7/1999 | Miller et al. | |
| 5,930,293 A | 7/1999 | Light et al. | |
| 5,936,591 A | 8/1999 | Yamasa et al. | |
| 5,943,011 A | 8/1999 | Acoraci et al. | |
| 5,969,837 A | 10/1999 | Farber et al. | |
| 6,064,665 A | 5/2000 | Leuck et al. | |
| 6,125,109 A | 9/2000 | Fuerter | |
| 6,188,373 B1 | 2/2001 | Martek | |
| 6,215,777 B1 | 4/2001 | Chen et al. | |
| 6,222,503 B1 * | 4/2001 | Gietema | H01Q 1/1207 343/700 MS |
| 6,366,789 B1 * | 4/2002 | Hildebrand | H04W 24/00 455/424 |
| 6,405,341 B1 | 6/2002 | Maru | |
| 6,418,558 B1 | 7/2002 | Roberts et al. | |
| 6,486,907 B1 | 11/2002 | Farber et al. | |
| 6,590,871 B1 | 7/2003 | Adachi | |
| 6,594,496 B2 * | 7/2003 | Schwartz | H04W 16/06 370/329 |
| 6,704,545 B1 | 3/2004 | Wala | |
| 6,715,349 B2 | 4/2004 | Atkinson | |
| 6,801,767 B1 * | 10/2004 | Schwartz | H04B 10/25755 398/115 |
| 6,831,901 B2 * | 12/2004 | Millar | H04J 3/047 370/315 |
| 6,870,515 B2 | 3/2005 | Kitchener et al. | |
| 6,906,681 B2 * | 6/2005 | Hoppenstein | H01Q 23/00 342/375 |
| 6,922,169 B2 | 7/2005 | Moh'd Izzat et al. | |
| 6,925,578 B2 | 8/2005 | Lam et al. | |
| 6,961,388 B2 | 11/2005 | Ling et al. | |
| 6,963,552 B2 | 11/2005 | Sabat, Jr. et al. | |
| 7,024,231 B2 * | 4/2006 | Cohen | H03F 1/0288 455/127.3 |
| 7,043,270 B2 * | 5/2006 | Judd | H01Q 1/246 370/310.2 |
| 7,215,651 B2 * | 5/2007 | Millar | H04J 3/047 370/315 |
| 7,233,771 B2 | 6/2007 | Proctor, Jr. et al. | |
| 7,260,153 B2 | 8/2007 | Nissani (Nissensohn) et al. | |
| 7,328,033 B2 | 2/2008 | Rappaport et al. | |
| 7,339,897 B2 | 3/2008 | Larsson et al. | |
| 7,346,040 B2 | 3/2008 | Weinstein | |
| 7,391,815 B2 | 6/2008 | Lakkis | |
| 7,395,040 B2 | 7/2008 | Behzad | |
| 7,403,576 B2 | 7/2008 | Lakkis | |
| 7,430,397 B2 | 9/2008 | Suda et al. | |
| 7,440,436 B2 | 10/2008 | Cheng et al. | |
| 7,443,708 B2 | 10/2008 | Madan et al. | |
| RE40,564 E | 11/2008 | Fischer et al. | |
| 7,446,630 B2 * | 11/2008 | Chan | H03H 7/18 333/138 |
| 7,450,637 B2 | 11/2008 | Lakkis | |
| 7,469,015 B2 | 12/2008 | Le Nir et al. | |
| 7,483,483 B2 * | 1/2009 | Lakkis | H04B 1/71632 375/238 |
| 7,483,504 B2 | 1/2009 | Shapira et al. | |
| 7,555,261 B2 | 6/2009 | O'Neill | |
| 7,587,001 B2 | 9/2009 | Hazani et al. | |
| 7,603,141 B2 | 10/2009 | Dravida | |
| 7,613,423 B2 | 11/2009 | Ngo et al. | |
| 7,630,356 B2 | 12/2009 | Zhang et al. | |
| 7,639,196 B2 | 12/2009 | Elliot et al. | |
| 7,650,261 B2 | 1/2010 | Takiishi et al. | |
| 7,653,083 B2 | 1/2010 | Liu et al. | |
| 7,653,146 B2 | 1/2010 | Kisovec et al. | |
| 7,653,148 B2 | 1/2010 | Kisovec et al. | |
| 7,656,842 B2 | 2/2010 | Thomas et al. | |
| 7,672,739 B2 | 3/2010 | Ganesan et al. | |
| 7,680,227 B2 * | 3/2010 | Kavadias | H04B 1/30 375/354 |
| 7,710,327 B2 | 5/2010 | Saban et al. | |
| 7,720,036 B2 | 5/2010 | Sadri et al. | |
| 7,751,775 B2 | 7/2010 | Baier et al. | |
| 7,760,699 B1 | 7/2010 | Malik | |
| 7,761,050 B2 | 7/2010 | Fitton et al. | |
| 7,787,823 B2 | 8/2010 | George et al. | |
| 7,809,073 B2 | 10/2010 | Liu | |
| 7,813,451 B2 | 10/2010 | Binder et al. | |
| 7,817,603 B2 | 10/2010 | Liu | |
| 7,822,148 B2 | 10/2010 | Shapira et al. | |
| 7,840,190 B2 | 11/2010 | Saban et al. | |
| 7,859,460 B2 * | 12/2010 | Hwang | H01Q 3/40 342/374 |
| 7,899,496 B2 | 3/2011 | Rhodes et al. | |
| 7,929,596 B2 | 4/2011 | Lakkis | |

(56) References Cited

U.S. PATENT DOCUMENTS

| | | | |
|---|---|---|---|
| 7,965,990 B2* | 6/2011 | Luz | H03F 3/189 |
| | | | 330/126 |
| 7,974,658 B2 | 7/2011 | Hunziker | |
| 7,986,973 B2 | 7/2011 | Rhodes et al. | |
| 8,000,222 B2* | 8/2011 | Yamagishi | H04L 27/2647 |
| | | | 370/207 |
| 8,010,116 B2 | 8/2011 | Scheinert | H04B 7/0691 |
| | | | 370/328 |
| 8,023,826 B2* | 9/2011 | Fasshauer | H01Q 1/1242 |
| | | | 398/115 |
| 8,055,216 B2* | 11/2011 | Dent | H01Q 1/246 |
| | | | 333/109 |
| 8,055,300 B2 | 11/2011 | Andersson et al. | |
| 8,063,822 B2* | 11/2011 | Adams | H01Q 1/246 |
| | | | 342/368 |
| 8,111,959 B2 | 2/2012 | Shapiro | |
| 8,121,535 B2 | 2/2012 | Proctor, Jr. et al. | |
| 8,121,646 B2 | 2/2012 | Oren et al. | |
| 8,126,396 B2 | 2/2012 | Bennett | |
| 8,131,218 B2 | 3/2012 | Kleider et al. | |
| 8,135,273 B2* | 3/2012 | Sabat, Jr. | H04B 10/25752 |
| | | | 398/17 |
| 8,138,761 B2* | 3/2012 | Evans | G01R 33/3692 |
| | | | 324/318 |
| 8,156,535 B2* | 4/2012 | Sage | H04N 7/17309 |
| | | | 725/121 |
| 8,159,954 B2 | 4/2012 | Larsson et al. | |
| 8,160,121 B2 | 4/2012 | Forenza et al. | |
| 8,170,081 B2 | 5/2012 | Forenza et al. | |
| 8,175,459 B2 | 5/2012 | Thelen et al. | |
| 8,175,649 B2 | 5/2012 | Saban et al. | |
| 8,184,681 B2 | 5/2012 | Binder et al. | |
| 8,195,224 B2 | 6/2012 | Saban et al. | |
| 8,208,414 B2* | 6/2012 | Singh | H04B 7/15507 |
| | | | 370/280 |
| 8,208,963 B2 | 6/2012 | Codreanu et al. | |
| 8,245,092 B2 | 8/2012 | Kotecha et al. | |
| 8,248,993 B2* | 8/2012 | Cai | H04B 7/0452 |
| | | | 370/328 |
| 8,289,910 B2* | 10/2012 | Gabriel | H01Q 1/246 |
| | | | 370/328 |
| 8,310,963 B2* | 11/2012 | Singh | H04B 7/2609 |
| | | | 370/280 |
| 8,320,957 B2 | 11/2012 | Saban et al. | |
| 8,325,693 B2 | 12/2012 | Hazani et al. | |
| 8,325,759 B2 | 12/2012 | Hazani et al. | |
| 8,331,425 B2 | 12/2012 | Nicolas et al. | |
| 8,346,091 B2 | 1/2013 | Kummetz et al. | |
| 8,351,531 B2 | 1/2013 | Yu et al. | |
| 8,362,955 B2* | 1/2013 | Adams | H01Q 1/246 |
| | | | 342/368 |
| 8,396,368 B2* | 3/2013 | Tarlazzi | H04B 7/0413 |
| | | | 398/115 |
| 8,412,260 B2 | 4/2013 | Rave | |
| 8,452,240 B2 | 5/2013 | Takahashi | |
| 8,457,026 B1* | 6/2013 | Ho | H04B 7/0617 |
| | | | 342/359 |
| 8,472,367 B2 | 6/2013 | Larsson et al. | |
| 8,503,544 B2 | 8/2013 | Chockalingam et al. | |
| 8,509,342 B2 | 8/2013 | Dufresne et al. | |
| 8,509,708 B2 | 8/2013 | Zhang et al. | |
| 8,514,915 B2 | 8/2013 | Binder et al. | |
| 8,514,963 B2 | 8/2013 | Matsumoto et al. | |
| 8,515,862 B2 | 8/2013 | Zhang et al. | |
| 8,548,330 B2 | 10/2013 | Berlin et al. | |
| 8,571,086 B2 | 10/2013 | Forenza et al. | |
| 8,588,193 B1* | 11/2013 | Ho | H04B 7/0617 |
| | | | 370/329 |
| 8,594,133 B2 | 11/2013 | Shapira et al. | |
| 8,594,223 B2 | 11/2013 | Ranson et al. | |
| 8,626,238 B2* | 1/2014 | Stratford | H04W 92/18 |
| | | | 455/560 |
| 8,644,844 B2 | 2/2014 | Shapira et al. | |
| 8,654,815 B1 | 2/2014 | Forenza et al. | |
| 8,655,396 B2 | 2/2014 | Malladi et al. | |
| 8,676,214 B2 | 3/2014 | Fischer et al. | |
| 8,681,916 B2 | 3/2014 | Braz et al. | |
| 8,681,917 B2 | 3/2014 | McAllister et al. | |
| 8,711,760 B2 | 4/2014 | Kasher | |
| 8,711,778 B2 | 4/2014 | Murata | |
| 8,730,848 B2 | 5/2014 | Schmid et al. | |
| 8,744,504 B2* | 6/2014 | Faccin | H04B 7/0413 |
| | | | 375/299 |
| 8,761,834 B2* | 6/2014 | Luz | H04B 7/0413 |
| | | | 455/101 |
| 8,774,079 B2* | 7/2014 | Proctor, Jr. | H04B 7/04 |
| | | | 370/315 |
| 8,798,209 B2 | 8/2014 | Lee et al. | |
| 8,824,588 B2 | 9/2014 | Emmanuel et al. | |
| 8,855,036 B2 | 10/2014 | Sabat et al. | |
| 8,873,585 B2 | 10/2014 | Oren et al. | |
| 8,874,047 B2* | 10/2014 | Alrabadi | H04B 1/525 |
| | | | 343/700 MS |
| 8,897,215 B2 | 11/2014 | Shapira et al. | |
| 8,913,963 B2* | 12/2014 | Lundstrom et al. | H04B 17/3912 |
| | | | 455/67.11 |
| 8,913,964 B2* | 12/2014 | Lundstrom | H04B 17/3912 |
| | | | 455/67.11 |
| 8,958,789 B2 | 2/2015 | Bauman et al. | |
| 8,976,887 B2 | 3/2015 | Reingold | |
| 9,008,205 B1 | 4/2015 | Al-Dhahir | |
| 9,014,237 B2 | 4/2015 | Li et al. | |
| 9,014,256 B2 | 4/2015 | Ranson et al. | |
| 9,019,929 B2 | 4/2015 | Berlin et al. | |
| 9,026,036 B2 | 5/2015 | Saban et al. | |
| 9,036,684 B2 | 5/2015 | Hui et al. | |
| 9,054,767 B2 | 6/2015 | Razaviyayn et al. | |
| 9,059,751 B2 | 6/2015 | Nosratinia et al. | |
| 9,100,048 B2 | 8/2015 | Carlach et al. | |
| 9,100,075 B2 | 8/2015 | Lorca Hernando | |
| 9,106,315 B2 | 8/2015 | Hanson et al. | |
| 9,160,437 B2 | 10/2015 | Ajima et al. | |
| 9,160,643 B2 | 10/2015 | Gao et al. | |
| 9,184,962 B2* | 11/2015 | Tarlazzi | H04B 7/024 |
| 9,203,147 B2* | 12/2015 | Adams | H01Q 1/246 |
| 9,203,496 B2 | 12/2015 | Fakhrai et al. | |
| 9,231,670 B2 | 1/2016 | Schmid et al. | |
| 9,246,559 B2 | 1/2016 | Tarlazzi et al. | |
| 9,270,359 B2* | 2/2016 | Asplund | H04B 7/0413 |
| 9,398,468 B1* | 7/2016 | Foo | H04W 16/28 |
| 2001/0036163 A1* | 11/2001 | Sabat, Jr. | H04W 16/14 |
| | | | 370/328 |
| 2002/0178809 A1 | 12/2002 | Atkinson | |
| 2002/0193146 A1 | 12/2002 | Wallace et al. | |
| 2003/0002604 A1 | 1/2003 | Fifield et al. | |
| 2003/0043928 A1* | 3/2003 | Ling | H04B 7/0417 |
| | | | 375/267 |
| 2003/0226071 A1* | 12/2003 | Millar | H04J 3/047 |
| | | | 714/712 |
| 2004/0100930 A1 | 5/2004 | Shapira et al. | |
| 2004/0106435 A1 | 6/2004 | Bauman et al. | |
| 2005/0143091 A1 | 6/2005 | Shapira et al. | |
| 2005/0249245 A1 | 11/2005 | Hazani et al. | |
| 2005/0266902 A1* | 12/2005 | Khatri | H04B 7/10 |
| | | | 455/575.7 |
| 2006/0063494 A1 | 3/2006 | Zhang et al. | |
| 2006/0202890 A1* | 9/2006 | Otto | H01Q 21/24 |
| | | | 342/362 |
| 2006/0229031 A1* | 10/2006 | Washiro | H04B 7/0613 |
| | | | 455/81 |
| 2006/0233200 A1 | 10/2006 | Fifield et al. | |
| 2007/0019679 A1 | 1/2007 | Scheck et al. | |
| 2007/0091988 A1* | 4/2007 | Sadri | H04B 1/0057 |
| | | | 375/219 |
| 2007/0093273 A1 | 4/2007 | Cai | |
| 2007/0104165 A1 | 5/2007 | Hanaoka et al. | |
| 2007/0177494 A1 | 8/2007 | Tomizawa | |
| 2007/0201536 A1 | 8/2007 | Nicolas et al. | |
| 2007/0274279 A1* | 11/2007 | Wood | H04W 88/10 |
| | | | 370/343 |

(56) References Cited

U.S. PATENT DOCUMENTS

| | | |
|---|---|---|
| 2008/0056332 A1 | 3/2008 | Lakkis |
| 2008/0056333 A1 | 3/2008 | Lakkis |
| 2008/0095259 A1 | 4/2008 | Dyer et al. |
| 2008/0102760 A1* | 5/2008 | McConnell .......... H04B 7/0617 455/73 |
| 2008/0107202 A1 | 5/2008 | Lee et al. |
| 2008/0112499 A1 | 5/2008 | Bennett |
| 2008/0114580 A1* | 5/2008 | Chin ................ H04B 17/3912 703/13 |
| 2008/0150514 A1 | 6/2008 | Codreanu et al. |
| 2008/0174502 A1 | 7/2008 | Oren et al. |
| 2008/0175175 A1 | 7/2008 | Oren et al. |
| 2008/0180190 A1* | 7/2008 | Chan ...................... H03H 7/18 333/118 |
| 2008/0191941 A1 | 8/2008 | Saban et al. |
| 2008/0198955 A1 | 8/2008 | Oren et al. |
| 2008/0200117 A1 | 8/2008 | Oren et al. |
| 2008/0232305 A1* | 9/2008 | Oren ...................... H04B 7/022 370/328 |
| 2008/0284647 A1 | 11/2008 | Oren et al. |
| 2008/0285667 A1* | 11/2008 | Mondal ................ H04B 7/0417 375/260 |
| 2009/0005096 A1 | 1/2009 | Scheinert |
| 2009/0029663 A1 | 1/2009 | Saban et al. |
| 2009/0061939 A1 | 3/2009 | Andersson |
| 2009/0080547 A1* | 3/2009 | Naka ...................... H04B 7/0604 375/260 |
| 2009/0097855 A1* | 4/2009 | Thelen ............... H04B 10/25752 398/115 |
| 2009/0124214 A1 | 5/2009 | Zhang et al. |
| 2009/0135944 A1 | 5/2009 | Dyer et al. |
| 2009/0141691 A1* | 6/2009 | Jain ...................... H04W 88/10 370/338 |
| 2009/0149144 A1* | 6/2009 | Luz ........................ H03F 3/189 455/216 |
| 2009/0180426 A1 | 7/2009 | Sabat et al. |
| 2009/0207077 A1* | 8/2009 | Hwang ...................... H01Q 3/40 342/374 |
| 2009/0219976 A1 | 9/2009 | Oren et al. |
| 2009/0274039 A1* | 11/2009 | Yamagishi .......... H04L 27/2647 370/210 |
| 2009/0279442 A1 | 11/2009 | Rave |
| 2009/0298421 A1 | 12/2009 | Andersson et al. |
| 2009/0316608 A1* | 12/2009 | Singh .................... H04W 88/085 370/280 |
| 2009/0316609 A1* | 12/2009 | Singh .................... H04B 7/2609 370/280 |
| 2009/0323582 A1* | 12/2009 | Proctor, Jr. ............ H04B 7/04 370/315 |
| 2010/0002620 A1* | 1/2010 | Proctor, Jr. ............ H01Q 1/521 370/315 |
| 2010/0027940 A1 | 2/2010 | Shapiro |
| 2010/0029320 A1 | 2/2010 | Malladi et al. |
| 2010/0062707 A1 | 3/2010 | Gou et al. |
| 2010/0093391 A1* | 4/2010 | Saban ...................... H04B 7/024 455/552.1 |
| 2010/0099451 A1* | 4/2010 | Saban ...................... H04W 4/20 455/502 |
| 2010/0117651 A1* | 5/2010 | Evans ................ G01R 33/3692 324/322 |
| 2010/0137024 A1* | 6/2010 | Maguire .............. H04B 1/0458 455/552.1 |
| 2010/0166098 A1* | 7/2010 | Luz ...................... H04B 7/0413 375/267 |
| 2010/0248651 A1* | 9/2010 | Dent ...................... H01Q 1/246 455/78 |
| 2010/0271985 A1* | 10/2010 | Gabriel ................ H01Q 1/246 370/278 |
| 2011/0002410 A1 | 1/2011 | Forenza et al. |
| 2011/0002411 A1 | 1/2011 | Forenza et al. |
| 2011/0003608 A1 | 1/2011 | Forenza et al. |
| 2011/0077044 A1 | 3/2011 | Sampath et al. |
| 2011/0135308 A1* | 6/2011 | Tarlazzi ................ H04B 7/0413 398/79 |
| 2011/0182217 A1 | 7/2011 | Schmid et al. |
| 2011/0201368 A1* | 8/2011 | Faccin .................. H04B 7/0413 455/507 |
| 2011/0230143 A1* | 9/2011 | Lundstrom ........... H04W 24/06 455/67.11 |
| 2011/0263215 A1* | 10/2011 | Asplund ............... H04W 24/06 455/115.1 |
| 2011/0292863 A1* | 12/2011 | Braz ...................... H04B 7/155 370/315 |
| 2011/0317679 A1* | 12/2011 | Jain ...................... H04W 88/10 370/338 |
| 2012/0213254 A1 | 8/2012 | Yokouchi et al. |
| 2012/0257659 A1 | 10/2012 | Braz et al. |
| 2012/0281622 A1 | 11/2012 | Saban et al. |
| 2012/0321314 A1 | 12/2012 | Oren et al. |
| 2013/0051404 A1 | 2/2013 | Binder et al. |
| 2013/0058281 A1 | 3/2013 | Berlin et al. |
| 2013/0113658 A1* | 5/2013 | Adams .................... H01Q 1/246 342/373 |
| 2013/0188753 A1* | 7/2013 | Tarlazzi ................ H04B 7/024 375/299 |
| 2013/0195467 A1 | 8/2013 | Schmid et al. |
| 2013/0279417 A1 | 10/2013 | Binder et al. |
| 2013/0295980 A1 | 11/2013 | Reuven et al. |
| 2013/0329825 A1 | 12/2013 | Oren et al. |
| 2014/0064399 A1 | 3/2014 | Oren et al. |
| 2014/0072071 A1 | 3/2014 | Berlin et al. |
| 2014/0079077 A1 | 3/2014 | Saban et al. |
| 2014/0119735 A1 | 5/2014 | Cune et al. |
| 2014/0135038 A1 | 5/2014 | Shapira et al. |
| 2014/0153918 A1 | 6/2014 | Hazani |
| 2014/0153919 A1 | 6/2014 | Casterline et al. |
| 2014/0161164 A1 | 6/2014 | Emmanuel et al. |
| 2014/0180581 A1 | 6/2014 | Berlin et al. |
| 2014/0211875 A1 | 7/2014 | Berlin et al. |
| 2014/0269966 A1 | 9/2014 | Faccin et al. |
| 2015/0023444 A1 | 1/2015 | Tarlazzi et al. |
| 2015/0031316 A1 | 1/2015 | Berlin et al. |
| 2015/0035705 A1 | 2/2015 | Anolik et al. |
| 2015/0038185 A1 | 2/2015 | Saban et al. |
| 2015/0093106 A1 | 4/2015 | Hazani |
| 2015/0110013 A1 | 4/2015 | Zhang et al. |
| 2015/0131632 A1 | 5/2015 | Hazani et al. |
| 2015/0139346 A1 | 5/2015 | Ko et al. |
| 2015/0188582 A1 | 7/2015 | Kahrizi et al. |
| 2015/0195055 A1 | 7/2015 | Ben-Shlomo |
| 2015/0215921 A1 | 7/2015 | Zhang et al. |
| 2016/0065293 A1* | 3/2016 | Tarlazzi ................ H04B 7/024 375/299 |

FOREIGN PATENT DOCUMENTS

| | | |
|---|---|---|
| CN | 1964216 A | 5/2007 |
| CN | 101815321 | 8/2010 |
| JP | 2010219949 | 9/2010 |
| WO | 9722186 A1 | 6/1997 |
| WO | 9827748 A2 | 6/1998 |
| WO | 9831133 A2 | 7/1998 |
| WO | 9955012 A2 | 10/1999 |
| WO | 0110156 | 2/2001 |
| WO | 0225506 | 3/2002 |
| WO | 2005048401 A1 | 5/2005 |
| WO | 2007054945 A2 | 5/2007 |
| WO | 2007133630 A2 | 11/2007 |
| WO | 2008004955 A2 | 1/2008 |
| WO | 2008027531 A2 | 3/2008 |
| WO | 2008076432 | 6/2008 |
| WO | 2008076432 A1 | 6/2008 |
| WO | 2008088859 A2 | 7/2008 |
| WO | 2008088862 A1 | 7/2008 |
| WO | 2008097651 A1 | 8/2008 |
| WO | 2008099383 A2 | 8/2008 |
| WO | 2008099390 A2 | 8/2008 |
| WO | 2008103374 A2 | 8/2008 |
| WO | 2008103375 A2 | 8/2008 |
| WO | 2009002938 A2 | 12/2008 |

(56) References Cited

FOREIGN PATENT DOCUMENTS

| WO | 2009053910 A2 | 4/2009 |
| --- | --- | --- |
| WO | 2009081376 A2 | 7/2009 |
| WO | 2009124624 | 10/2009 |
| WO | 2009138876 A2 | 11/2009 |
| WO | 2009155602 A1 | 12/2009 |
| WO | 2010013142 A1 | 2/2010 |
| WO | 2010059103 | 5/2010 |
| WO | 2010059103 A1 | 5/2010 |
| WO | 2010060490 A1 | 6/2010 |
| WO | 2010075865 A1 | 7/2010 |
| WO | 2010089719 A1 | 8/2010 |
| WO | 2011071870 A1 | 6/2011 |
| WO | 2011100219 A1 | 8/2011 |
| WO | 2012044969 A1 | 4/2012 |
| WO | 2012075137 A1 | 6/2012 |
| WO | 2016057304 | 4/2016 |

OTHER PUBLICATIONS

Four-Page Bong Youl Cho, et al., "Practical Scheme to Enable MIMO Communications in Distributed Antenna Systems for Efficient Indoor Coverage" Symposium on Communications and Information Technology, IEEE, Piscataway, NJ, USA, Sep. 28, 2009 pp. 25-28.

Four-Page Annex to Communication Relating to the Results of the Partial International Search mailed Mar. 16, 2011 (PCT/US2010/059220).

Twenty-One Page International Search Report and Written Opinion mailed May 9, 2011 (PCT/US2011/59220).

Twelve-Page Written Opinion and Search Report mailed Mar. 1, 2012 for PCT Application PCT/US2011/062640.

Four-Page Tarlazzi, et al. "Characterization of an Interleaved F-DAS MIMO Indoor Propagation Channel", Nov. 8-9, 2010, Loughborough, UK, pp. 505-508.

Thirteen-Page Written Opinion and Search Report mailed Dec. 21, 2015 for PCT Application PCT/US2015/053484.

Korean Patent Office, "Office Action for KR Application No. 10-2012-7017579", "from Foreign Counterpart to U.S. Appl. No. 12/634,212", Sep. 28, 2016, pp. 1-12, Published in: KR.

China Patent Office, "Notice to Grant Patent Right for CN Application No. 201080055830.4", "from Foreign counterpart to U.S. Appl. No. 12/634,212", Jan. 23, 2015, pp. 1-2, Published in: CN.

China Patent Office, "First Office Action from CN Application No. 201080055830.4", "from Foreign Counterpart to U.S. Appl. No. 12/634,212", Jul. 29, 2014, pp. 1-7, Published in: CN.

China Patent Office, "First Office Action for CN Application No. 201180064589.6", "from Foreign Counterpart to U.S. Appl. No. 13/794,416", Sep. 6, 2015, pp. 1-6, Published in: CN.

Korean Intellectual Property Office, "Notice of Allowance of Patent for KR Application No. 10-2012-7017579", "from U.S. Appl. No. 12/634,212", Dec. 14, 2016, pp. 1-3, Published in: KR.

U.S. Patent Office, "Notice of Allowance", "from U.S. Appl. No. 12/634,212", Oct. 18, 2012, pp. 1-5, Published in: US.

U.S. Patent Office, "Office Action", "from U.S. Appl. No. 12/634,212", Apr. 17, 2012, pp. 1-31, Published in: US.

U.S. Patent Office, "Final Office Action", "from U.S. Appl. No. 13/794,416", Feb. 23, 2015, pp. 1-28, Published in: US.

U.S. Patent Office, "Notice of Allowance", "from U.S. Appl. No. 13/794,416", Jul. 8, 2015, pp. 1-5, Published in: US.

U.S. Patent Office, "Office Action", "from U.S. Appl. No. 13/794,416", Oct. 9, 2014, pp. 1-32, Published in: US.

U.S. Patent Office, "Notice of Allowance", "from U.S. Appl. No. 14/510,883", Sep. 9, 2015, pp. 1-34, Published in: US.

Italian Search Report, "Search Report from IT Application No. ITBO20100714", Dec. 1, 2010, pp. 1-8, Published in: IT.

China Patent Office, "First Office Action for CN Application No. 201510160749.7", "Foreign Counterpart to U.S. Appl. No. 12/634,212", dated Jul. 19, 2017, pp. 19, Published in: CN.

European Patent Office, "Communication Pursuant to Article 94(3) for EP Application No. 10790813.9", "Foreign Counterpart to U.S. Appl. No. 12/634,212", dated Jun. 6, 2017, pp. 16, Published in: EP.

\* cited by examiner

DISTRIBUTED ANTENNA SYSTEM FOR MIMO SIGNALS

RELATED APPLICATIONS

This application is a Continuation application of U.S. patent application Ser. No. 13/794,416, filed Mar. 11, 2013, entitled "DISTRIBUTED ANTENNA SYSTEM FOR MIMO SIGNALS"; which application is a Continuation-in-Part application of U.S. patent application Ser. No. 12/634,212, filed Dec. 9, 2009, entitled "DISTRIBUTED ANTENNA SYSTEM FOR MIMO SIGNALS", now Issued U.S. Pat. No. 8,396,368, issued Mar. 12, 2013; the applications and disclosures of which are hereby incorporated by reference in their entireties as though fully disclosed herein.

The U.S. patent application Ser. No. 13/794,416 is also a Continuation application of International Application No. PCT/US2011/062640, filed Nov. 30, 2011, entitled "DISTRIBUTED ANTENNA SYSTEM FOR MIMO SIGNALS", which in turn, claims priority to Italian Patent Application No. 2010A000714, filed Dec. 1, 2010, entitled "DISTRIBUTED ANTENNA SYSTEM FOR MIMO SIGNALS", the applications and disclosures of which are hereby incorporated by reference in their entireties as though fully disclosed herein.

The pending U.S. patent application Ser. No. 14/510,883 is hereby incorporated by reference in its entirety as though fully disclosed herein.

FIELD OF THE INVENTION

Embodiments of the invention are directed to wireless communication systems, and specifically directed to a distributed antenna system for a wireless MIMO communications.

BACKGROUND OF THE INVENTION

A contemporary wireless communication system, such as distributed antenna system 10, is shown in FIG. 1, and includes a number of remote units 12 distributed to provide coverage within a service area of the system 10. In particular, each remote antenna unit 12 typically includes an antenna 14 and suitable electronics. Each remote unit is coupled to a master unit 16. Each master unit 16 is, in turn, coupled to a RF combination network 18 that combines the signals from at least one single-input- and single-output ("SISO") base transceiver station ("BTS," or more simply, "base station") 20 (hereinafter, "SISO BTS" 20). The system 10 may further include a system controller 22 to control the operation of each master unit 16. As illustrated in FIG. 1, the system 10 may include a plurality of master units 16 and a plurality of SISO BTSs 20, each master unit 16 configured to provide a combination of the signals from at least two SISO BTSs 20 to its respective remote units 12.

As illustrated in FIG. 1, each remote unit 12 may broadcast a wireless signal 24 that, in turn, may be received by a wireless device 26 that may be a mobile device, such as a telephone device or a computing device. In particular, and as discussed above, the wireless signal 24 from each remote unit 12 may be a combination of signals from the at least two SISO BTSs 20. Thus, the wireless device 26 may communicate with the system 10 through any of the wireless signals 24 from the remote units 12.

To improve wireless communications, such as communications from a base station to mobile devices, Multiple-Input/Multiple-Output ("MIMO") technology might be utilized to provide advanced solutions for performance enhancement and broadband wireless communication systems. Through various information series studies, it has been shown that substantial improvements may be realized utilizing a MIMO technique with respect to the traditional SISO systems. MIMO systems have capabilities that allow them to fully exploit the multi-path richness of a wireless channel. This is in contrast with traditional techniques that try to counteract multi-path effects rather than embrace them. MIMO systems generally rely upon multi-element antennas at both of the ends of the communication links, such as in the base station and also in the mobile device. In addition to desirable beam-forming and diversity characteristics, MIMO systems also may provide multiplexing gain, which allows multi data streams to be transmitted over spatially-independent parallel sub-channels. This may lead to a significant increase in the system capacity. Generally, the systems illustrated in FIG. 1 cannot take advantage of MIMO technology.

For example, the wireless device 26 of FIG. 1 communicates with only one of the remote units 12, though it may be in the range of a plurality of remote units 12. The wireless signals 24 from each remote unit are typically at the same frequency and carry the same data, and communication between a plurality of remote units 12 and the wireless device 26 simultaneously may result in signal degradation and collisions. Moreover, data bandwidth from the wireless device 26 is constricted to the speed of reception and processing of data from one remote unit 12.

It is therefore, desirable to take advantage of MIMO signals within a wireless system, such as distributed antenna system, without requiring an entirely new system to be installed for handling MIMO signals.

SUMMARY OF THE INVENTION

Embodiments of the invention provide a distributed antenna system ("DAS") and methods of use that can be used to provide a multiple-input and multiple-output ("MIMO") mode of operation. In particular, some embodiments include a MIMO base station configured to output at least a first signal and a second signal and a hybrid coupler coupled to review the first and second signals. The coupler is configured to receive the first signal and the second signals on respective first and second ports and provide an output signal on output ports. The output signals include at least a portion of the first signal and at least a portion of the second signal. The system further includes at least one master unit communicating, and at least one remote unit communicating with the master unit and configured to communicate at least the output signals to a device, such as a customer's wireless device.

It should be understood that the appended drawings are not necessarily to scale, presenting a somewhat simplified representation of various preferred features illustrative of the basic principles of embodiments of the invention. The specific design features of the system and/or sequence of operations as disclosed herein, including, for example, specific dimensions, orientations, locations, and shapes of various illustrated components, will be determined in part by the particular intended application and use environment. Certain features of the illustrated embodiments may have been enlarged, distorted or otherwise rendered differently relative to others to facilitate visualization and clear understanding.

DETAILED DESCRIPTION OF THE INVENTION

Figure 1:
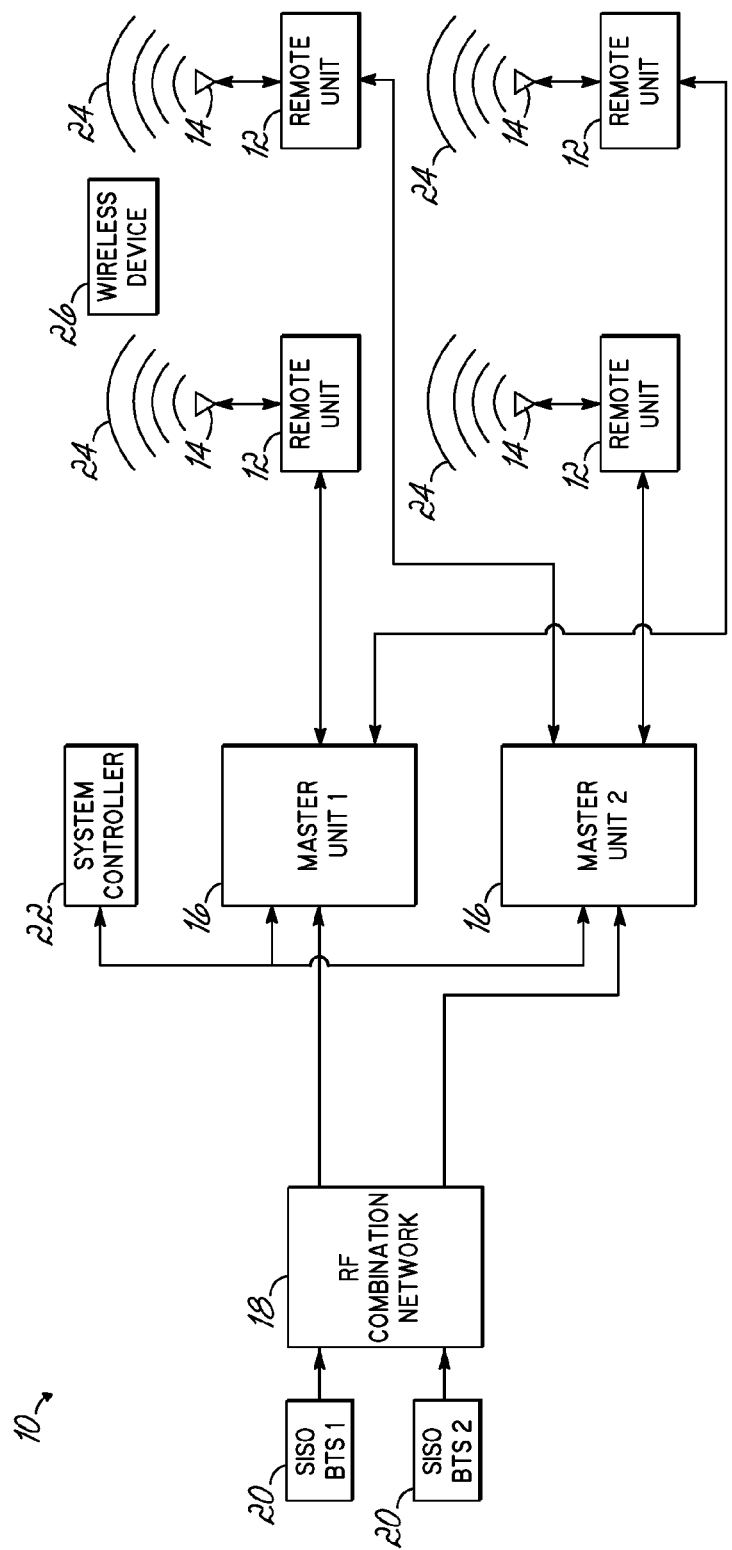
FIG. 1 is a block diagram of a contemporary distributed antenna system.
Figure 2A:
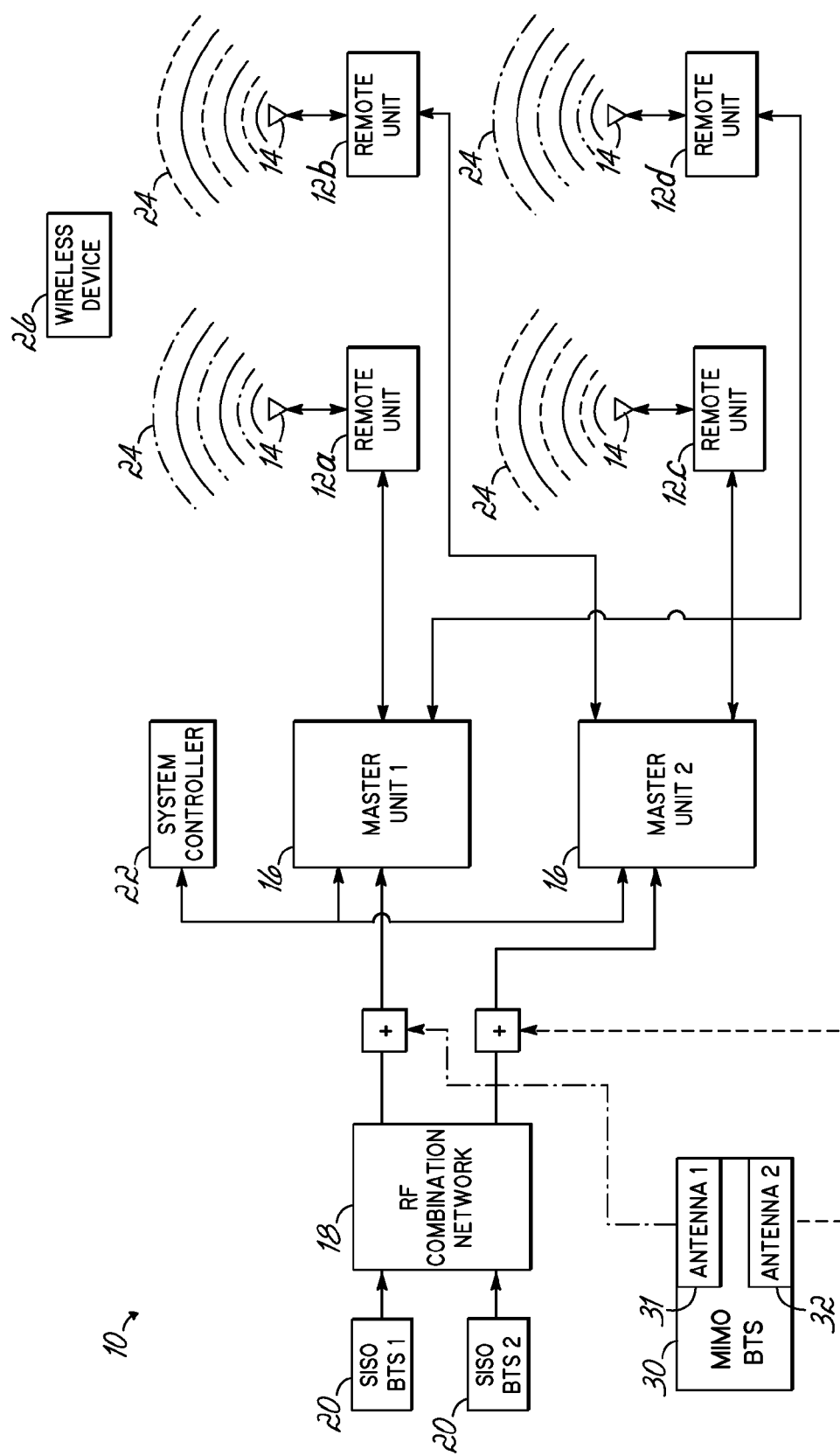
FIG. 2A is a block diagram of a distributed antenna system consistent with embodiments of the invention.

FIG. 2A illustrates a schematic view of one possible implementation of a MIMO system, wherein a MIMO base station is incorporated with a distributed antenna system, such as that shown in FIG. 1. With respect to FIG. 1, like reference numerals are utilized in FIG. 2A where applicable. As illustrated, two SISO base stations 20 (each SISO base station 20 a "SISO BTS" 20) are coupled with each of the remote units. Additionally, a MIMO base station 30, including antennas 31 and 32, are coupled with the remote units 12. Antenna 1 of the MIMO BTS 30 is coupled with remote units 12a and 12d through a first master unit 16 (MASTER UNIT 1). Antenna 2 of the MIMO BTS 30 is coupled with remote units 12b and 12c through as second master unit 16 (MASTER UNIT 2). As such, as illustrated by the wireless signals 24 produced at each remote unit, each master unit will transmit signals from the MIMO BTS 30, in addition to a combined signal from the combination of signals output by the SISO BTSs 20. However, because each antenna is not coupled to all the remote units, each remote unit will only transmit one of the two available MIMO signals as shown. The respective wave fronts are illustrated corresponding to the feed or connection lines from each of the appropriate antennas 31, 32 in FIG. 2A.

While the embodiment illustrated in FIG. 2A may be utilized to provide the availability of MIMO signals within a distributed antenna system, such a system may not realize all of the desired performance improvements associated with a MIMO system. For example, even if wireless device 26 receives all the MIMO signals from a combination of at least two of the remote units, there may be a received RF power imbalance because the wireless device 26 might be located much closer to one remote unit 12 than to another. Furthermore, accordingly to wireless standards that support MIMO features, there are some signaling parameters, such as the WiMAX Frame Preamble or the LTE Primary Synchronization Signal ("P-SS"), which are, or actually can be, transmitted by only one of the MIMO BTS antennas 31, 32. Therefore, in a MIMO system, as in FIG. 2A, wherein these signals are not transmitted by all of the remote units, the system may not be sufficiently reliable unless there is a very high level of coverage redundancy/overlap between the remote units. In operation, dynamic switching between SISO and MIMO operating modes may present performance problems.

Figure 2B:
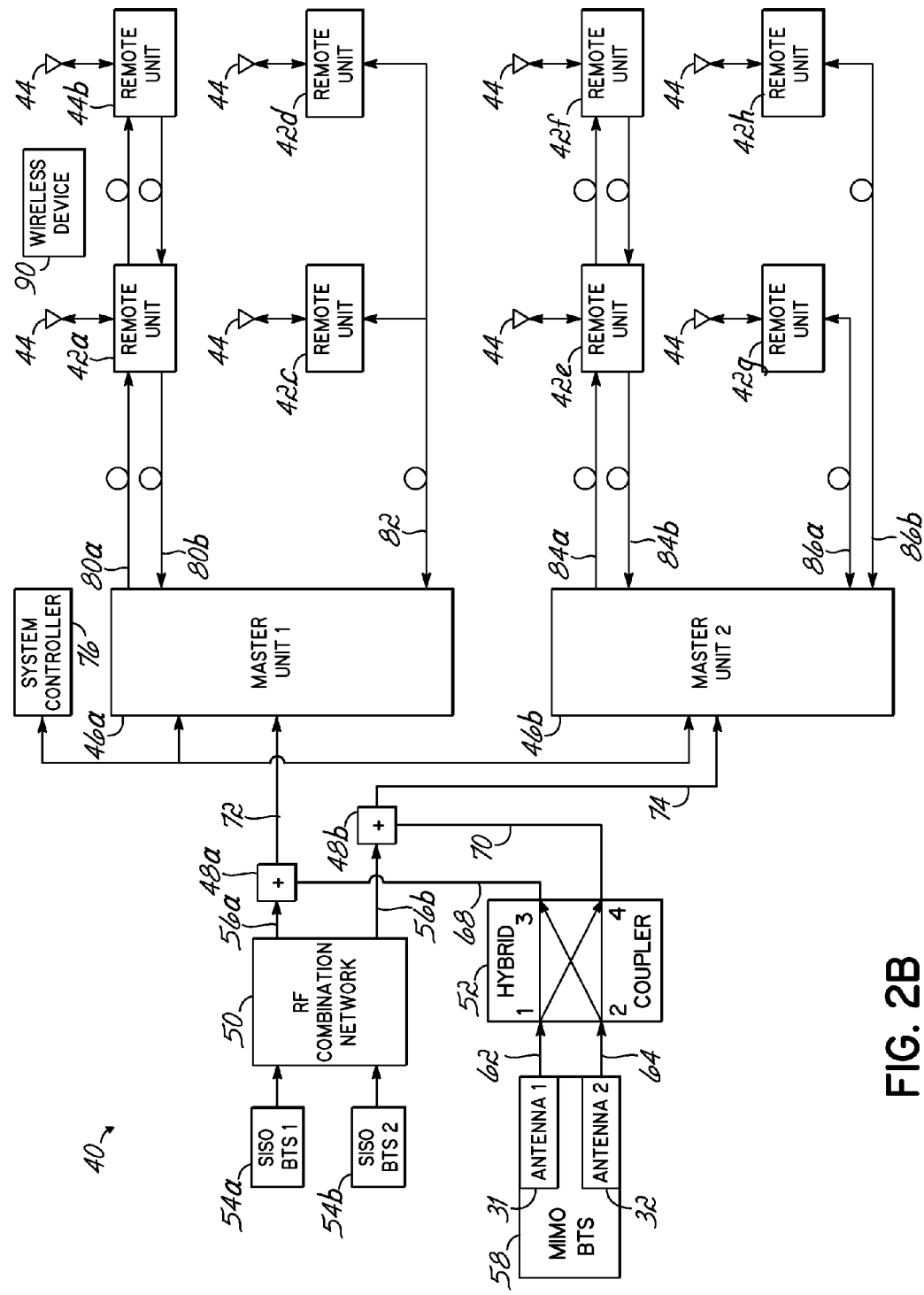
FIG. 2B is a block diagram of a distributed antenna system consistent with embodiments of the invention.

FIG. 2B illustrates a schematic view of another possible implementation of a distributed antenna system 40 that incorporates MIMO features consistent with embodiments of the invention. System 40 includes at least one remote unit 42 to provide coverage in a service area. In particular, system 40 includes a plurality of remote units 42a-h. Each remote unit 42a-h includes at least one coverage antenna 44 and is coupled to a master unit 46a-b. Each master unit 46a-b, in turn, is coupled to a respective summing circuit 48a-b that may be configured to combine at least two inputs. In particular, each summing circuit 48a-b combines a signal from an RF combination network 50 coupled to SISO BTSs 54a and 54b with a signal from the MIMO BTS 58. The signals 68, 70 from the MIMO base station are presented through a hybrid coupler 52 coupled with the signals from the antennas 31 and 32 of the MIMO BTS 58. The RF combination network 50 is coupled to a plurality of SISO BTSs 54a-b and outputs at least one combined SISO BTS signal as at 56a-b.

In one aspect of the present invention, a hybrid coupler 52 is coupled to the MIMO BTS 58 to cross-couple all MIMO signals (in the example illustrated that is two MIMO signals) to each of the remote units 42. Therefore, each of the remote units 42 transmits all of the MIMO BTS 58 data streams, as well as the combined data streams from the SISO BTSs 54. The hybrid coupler 52 is configured to receive at least two MIMO signals from the respective antennas 31 and 32 on respective first and second ports (Ports 1 and 2 as illustrated in FIGS. 2A-B), and provide an output signal on at least one output port (Ports 3 and 4 as illustrated in FIGS. 2A-B). In the illustrated embodiment, combined signals from the two MIMO BTS antennas 31 and 32 are provided at the output ports 3 and 4. Each output signal includes at least a portion of the first signal from antenna 31, and at least a portion of the second signal from antenna 32. In the hybrid coupler circuit, the portion of the first signal (e.g., Antenna 1) or the portion of the second signal (e.g., Antenna 2) presented at one of the input ports 1, 2 is phase shifted with respect to the first signal and/or second signal received at the respective other of first and second coupler ports 1, 2. In particular, the hybrid coupler 52 is disposed between a MIMO BTS 58 and master stations 46a-b such that the hybrid coupler 52 is configured to receive the first and second signals from the MIMO BTS 58, including a first signal at 62 from a first MIMO antenna 31, and a second signal at 64 from a second MIMO antenna. In turn, the hybrid coupler 52 combines a portion of the first signal 62 with a phase shifted portion of the second signal 64 and outputs that first output signal at 68 on a first output port (e.g., output port 3). Coupler 52 also combines a portion of the second signal 64 with a phase shifted portion of the first signal 62 and outputs that second output signal at 70 on a second output port (e.g., output port 4). In one exemplary embodiment, the hybrid coupler 52 is a 90° 3 dB coupler (also referred to as a "quadrature" coupler).

Furthermore, it will be appreciated that, in some embodiments, the first and second signals from the MIMO BTS 58 may be separately provided to respective summing circuits 48a-b and/or master units 46a-b rather than passing through hybrid coupler 58, such as the embodiment shown in FIG. 2A.

In some embodiments, the summing circuit 48a is configured to provide a first master unit signal 72 that is a combination of the combined SISO BTS signal 56a and the first combined MIMO signal 68. Summing circuit 48b is configured to provide a second master unit signal 74 that is a combination of the combined SISO BTS signal 56b and the second combined MIMO signal 70. The master units 46a-b and remote units 42a-h, in turn, may be controlled by a system controller 76, which may provide overall supervision and control of the master units 46a-b and remote units 42a-h, as well as alarm forwarding.

In some embodiments, each remote unit 42a-h may be connected to their respective master units 46a-b via high speed digital transport mediums or links 80a-b, 82, 84a-b and/or 86a-b. Alternatively, an analog transport medium/link might be used for connecting the remote units with respective master units. Also, the transport links might be implemented as optical links using optical fiber as discussed below. With such fiber, the traffic between the remote units and master units might be implemented using a radio-over-fiber (RoF) format. In this manner, the first master unit signal 72 and/or the second master unit signal 74 are provided to at least a portion of the remote units 42a-h in a digital format, which may assist in preventing at least some degradation due to transmission line effects. It will be appreciated by one having ordinary skill in the art that filtering may also be used to allow and/or prevent the distribution of specific signals. As such, and in some embodiments, each of the links 80a-b, 82, 84a-b and/or 86a-b may be a wideband digitally modulated optical interface, such as fiber optic cable. Thus, each master unit 46a and/or 46b may be configured to digitize their respective master unit signals 72 and/or 74 and output those digital signals for their respective remote units 42a-42d and/or 42e-h. These digital output signals may, in some embodiments, be time division multiplexed into frames and converted into a serial stream. The remote units 42a-42d and/or 42e-h, in turn, may be configured to receive the digital output signals from their respective master units 46a and/or 46b, convert the digital output signals into electrical signals, if necessary de-frame various time slots and/or de-serialize the electrical signals, and transmit the electrical signals via their local antenna 44 to at least one wireless unit 90.

The remote units 42a-h are configured to send and/or receive digital RF voice and/or data signals to and/or from a wireless unit 90 via their local antennas 44. As discussed below, depending on how the remote units are coupled to the master units, the remote units 42b, 42d and/or 42f may also be configured to receive a digital signal from remote units 42a, 42c and/or 42e, respectively, which precede it in a chain. This digital signal between remote units may contain signals from the wireless unit 90 received by the preceding remote units 42a, 42c and/or 42e. The digital signal may then be combined with another signal received by the remote units 42a, 42c and/or 42e. As such, digital wireless signals from wireless units 90 may be combined and/or transmitted back to a respective master unit 46a and/or 46b. The master units 46a and/or 46b may then convert a signal from its respective remote units 42a-d and/or 42e-h from an optical signal to an electrical signal and send the electrical signal to the SISO BTSs 54a-b and MIMO BTS 58, which may be configured to detect and receive their respective portions thereof. Alternatively, the master units 46a and/or 46b may then convert a signal from its respective remote units 42a-d and/or 42e-h from an optical signal to an electrical signal, separate the electrical signal into a plurality of electrical signals in a plurality of bands corresponding to those utilized by the SISO BTSs 54a-b and MIMO BTS 58, convert the plurality of electrical signals into a plurality of analog signals, and send the plurality of analog signals to the SISO BTSs 54a-b and/or MIMO BTS 58.

As illustrated in FIG. 2B, by way of example, a master unit 46a-b may be selectively connected to respective remote units 42a-h in a number of ways. For example, master unit 46a is illustrated as connected to remote units 42a-b through half-duplex link 80a for uplink to the remote units 42a-b and half-duplex link 80b for downlink. However, master unit 46a is illustrated as connected to remote units 42c-d through full-duplex link 82. Similarly, master unit 46b is illustrated as connected to remote units 42e-f through half-duplex link 84a for uplink to the remote units 42e-f and half-duplex link 84b for downlink. However, master unit 46b is illustrated as connected to remote unit 42g through full-duplex link 86a and connected to remote unit 42h through full-duplex link 86b. As such, in a full-duplex link, the uplink signals and downlink signals are carried on different wavelengths and a wavelength division multiplexer ("WDM") is employed to combine and/or split the two optical signals at the master units 46a-b and remote units 42a-h. Alternatively, the master units 46a-b and remote units 42a-h may communicate through a different transceiver for high data rate media such as coax cable, twisted pair copper wires, free space RF or optics, or shared networks such as Ethernet, SONET, SDH, ATM and/or PDH, among others. As will be appreciated, one or more of the exemplary links, as illustrated in FIG. 2B, might be selected for coupling all of the remote units to the master units.

In some embodiments, the system 40 illustrated in FIG. 2B may be selectively and dynamically utilized as a SISO system and/or a MIMO system. For example, if the hybrid coupler 52 is not activated, the signals from the SISO BTSs 54a-b may be transmitted to at least a portion of the remote units 42a-h and the system may be utilized similarly to a SISO system. In this manner, each of the remote units 42a-h communicates through at least two wireless frequencies that correspond to those used by the SISO BTSs 54a-b. However, when the hybrid coupler 52 is selectively activated, the signals from the SISO BTSs 54a-b may be combined with the combined MIMO output signals 68, 70 such that each remote unit 42a-h communicates the signals from the SISO BTSs 54a-b through at least two wireless frequencies that correspond to those used by the SISO BTSs 54a-b and communicates both or all of the MIMO signals. Thus, selective activation of the hybrid coupler 52 results in dynamically reconfiguring the system 40 from a SISO mode of operation to a MIMO mode of operation. As such, the system 40 may be used as an indoor MIMO system that is configured to handle a WiMAX Frame Preamble and/or LTE P-SS (Primary Synchronization Signal) that either are, or optionally can be, transmitted by only one of the MIMO BTS antennas.

Thus, portions of the first and second signals 62 and 64 from the MIMO BTS 58 may be cross-coupled and combined and sent to all the remote units 42a-h without affecting the MIMO operation thereof. For example, each remote unit 42*a-h* of the system 40 may be configured to transmit both (or all) data streams from the MIMO BTS 58 and its antennas 31, 32 (e.g., the output signal 68 or the output signal 70) along with the combined SISO BTS signals 56*a-b*.

Figure 3:
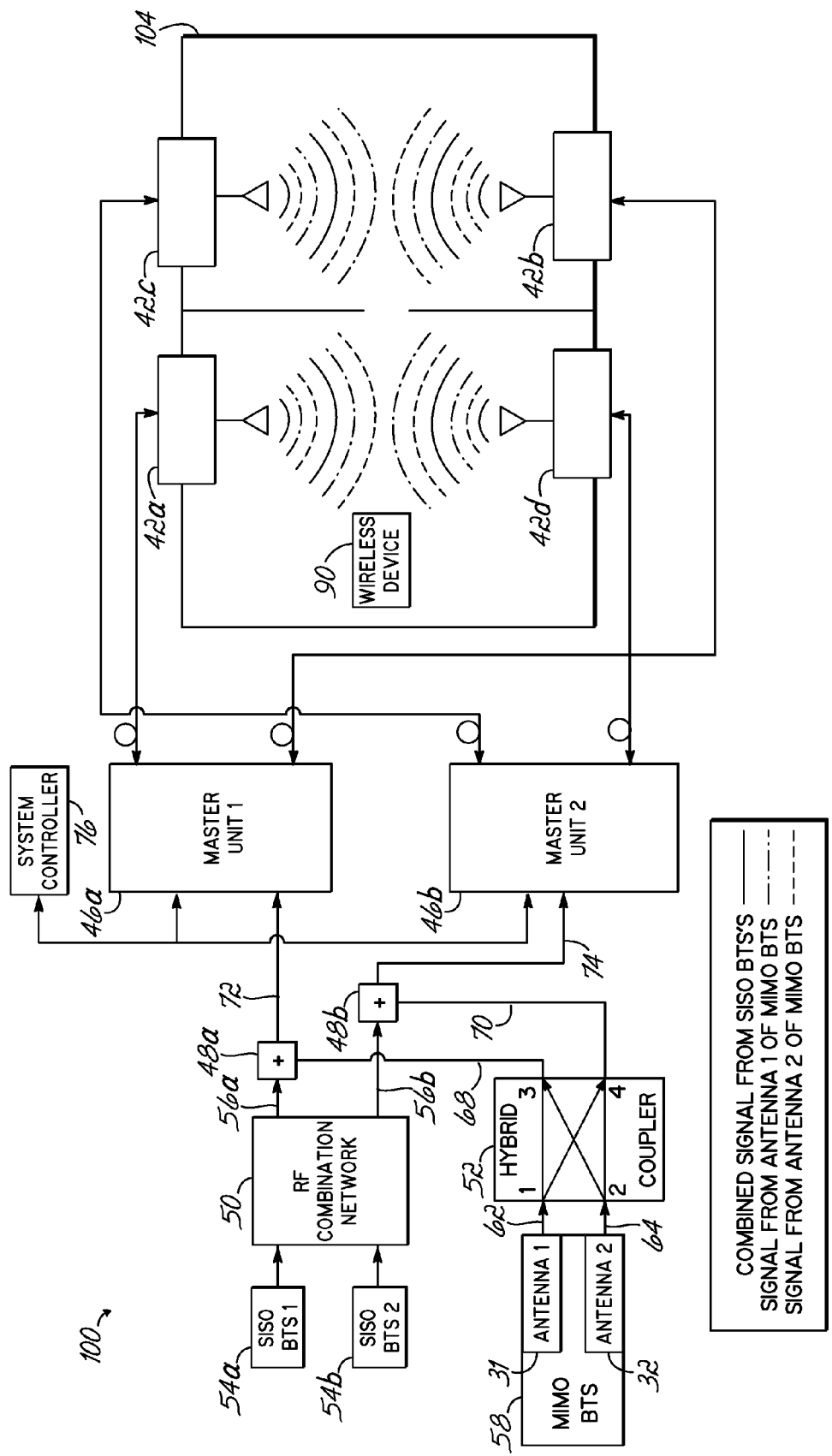
FIG. 3 is a block diagram of a distributed antenna system consistent with embodiments of the invention used with an indoor environment.

FIG. 3 illustrates a schematic view of a wireless communication system 100 similar to the system 40 of FIG. 2B, but that includes a plurality of remote units 42*a-d* used in an indoor environment 104. In particular, FIG. 3 illustrates that remote units 42*a-b* coupled to the master unit 46*a* may be positioned about the indoor environment 104 such that their signals are not substantially overlapping. Remote units 42*c-d* may be similarly positioned. As such, a wireless device 90 in a portion of the environment 104 may be able to receive signals from two remote units (as illustrated in FIG. 3, wireless device 90 receives signals from remote units 42*a* and 42*d*). As such, MIMO spatial multiplexing may be exploited, as the wireless device 90 is capable of receiving two non-identical signals from two remote units 42*a* and 42*d* fed by two different master units 46*a* and 46*b*, respectively.

Referring to FIG. 3, by incorporating a hybrid coupler in the distributed antenna system in accordance with the invention, all of the MIMO signals (in this case, both MIMO signals) can be cross-coupled and sent to all of the remote units without affecting the MIMO operation. Each remote unit can transmit both the MIMO parallel data streams without producing inter-stream interference because there are 90° of phase shifting between them. That is, a distributed MIMO concept is split in two parallel distributed MIMO systems. The first one is "in phase", while the second one is "90° phase shifted". Of course, in order to exploit the MIMO spatial multiplexing, it is necessary that the wireless device 90 receive substantial power contributions from at least two of the remote units that are fed by different master units. Therefore, as such, it is desirable that the wireless device 90 receives power from more than one of the two remote units, for example 42*a*, 42*d*, that are coupled with different master units, in order to maintain MIMO spatial multiplexing.

One benefit of the invention is that it solves problems noted above wherein the remote units transmit signals associated with only one of the MIMO base station antennas. Similarly, performance impairments between transmitted parallel data streams that may affect the wireless unit 90 when located closer to a specific remote unit 42*a-d* may be addressed, as received power levels for two signals from two remote units 42*a-d* are typically similar for most locations in the indoor environment 104, thus increasing data throughput. This issue is often referred to as the "near-far problem" affecting a distributed MIMO system with remote units transmitting only a single data stream. This issue is addressed as discussed herein below using a 3 dB 90° Hybrid coupler.

Another particular benefit of the present invention is the ability to provide deployment of a MIMO system within an existing distributed antenna infrastructure that is originally implemented for a SISO system. The present invention may also operate with a selective coupling or dynamic switching between a SISO and a MIMO operation mode that is performed by a MIMO base station. Furthermore, when the MIMO base station operates in downlink spatial multiplexing mode, the invention provides the performance equalization related to the transmitted parallel data streams. That is, as noted, the 90° 3 dB hybrid coupler is used in order to solve the "near-far problem". The inter-stream cross-coupling performed through the Hybrid Coupler acts similarly to or as a substitute for the MIMO pre-coding as specified by the 3GPP LTE standard in order to address the potential mismatch in performance between the two data streams. That is, the pre-coding provided by the invention is intended to equalize the performance (like bit error rate, error vector magnitude, etc.) of two data streams experiencing different channel conditions. In case of the "near-far problem" the two streams experience different channel path-losses. Furthermore for a proper operation of the LTE standard, it is mandatory that the pre-coding coding scheme is orthogonal so that the original symbols can be recovered at the receiver avoiding inter-stream interference. This condition is met by the 90° Hybrid Coupler input-output transfer function as discussed below in accordance with one aspect of the invention.

Figure 8:
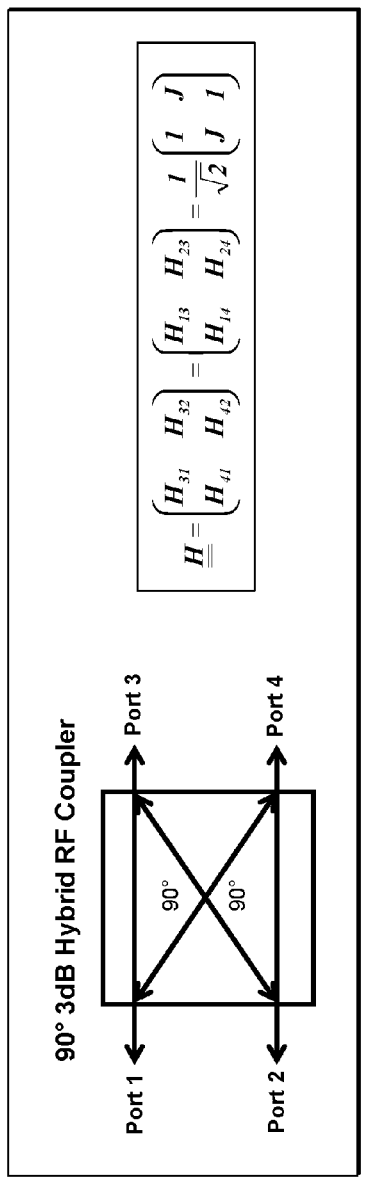
FIG. 8 is a block diagram of a 90° 3 dB hybrid coupler and transfer function representation.
Figure 9:
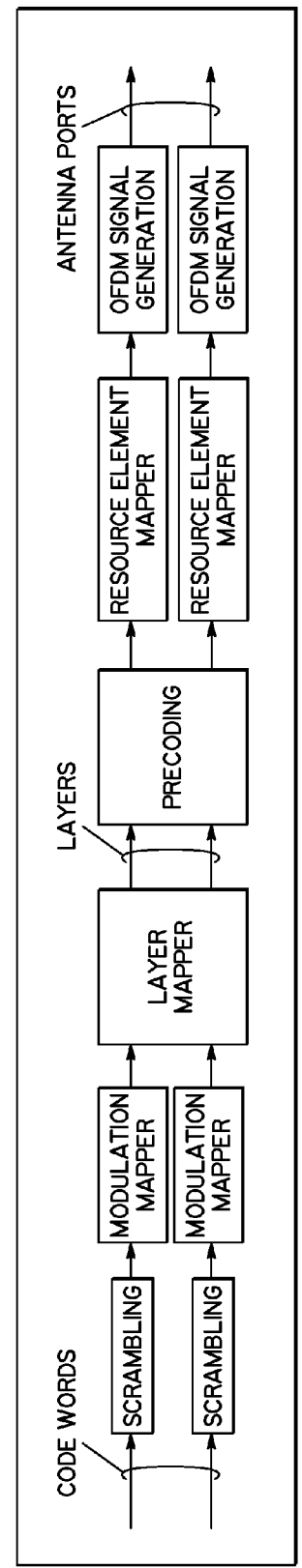
FIG. 9 is a block diagram of an overview of LTE physical channel processing.

With reference to FIG. 8, a 90° 3 dB hybrid coupler is shown and acts as a "hardware" MIMO pre-coding circuit to compensate for possible performance impairment between the data streams (code-words) due to the "near-far problem". The equation shown in FIG. 8 illustrates the input and output port relationship and the transfer function matrix of a 90° 3 dB hybrid coupler, respectively. As such, in accordance with an aspect of the invention, the transfer function matrix reflected in FIG. 8 can also be regarded as the MIMO pre-coding matrix of the 90° 3 dB hybrid coupler. FIG. 9 illustrates the location of the MIMO pre-coding block in a typical LTE physical channel processing stream. In accordance with an aspect of the present invention, the exploitation of a 90° 3 dB hybrid coupler into the LTE MIMO distributed antenna system as disclosed herein locates the performance of the pre-coding at the BTS antenna ports rather than in the BTS physical channel processing. Therefore the invention also represents a hardware improvement to the MIMO BTS scheduler circuitry which is responsible for pre-coding selection on the User Equipment's feedback basis.

In accordance with another aspect of the present invention, the hybrid coupler that is utilized in embodiments of the invention makes input signals orthogonal to each other. The device's reciprocity between the input ports 1, 2 and the output ports 3, 4 provides that the resulting transfer function matrix remains the same, even exchanging the input and output ports. This provides the invention with the ability to combine MIMO signals without affecting their capability to support spatial multiplexing.

Figure 4:
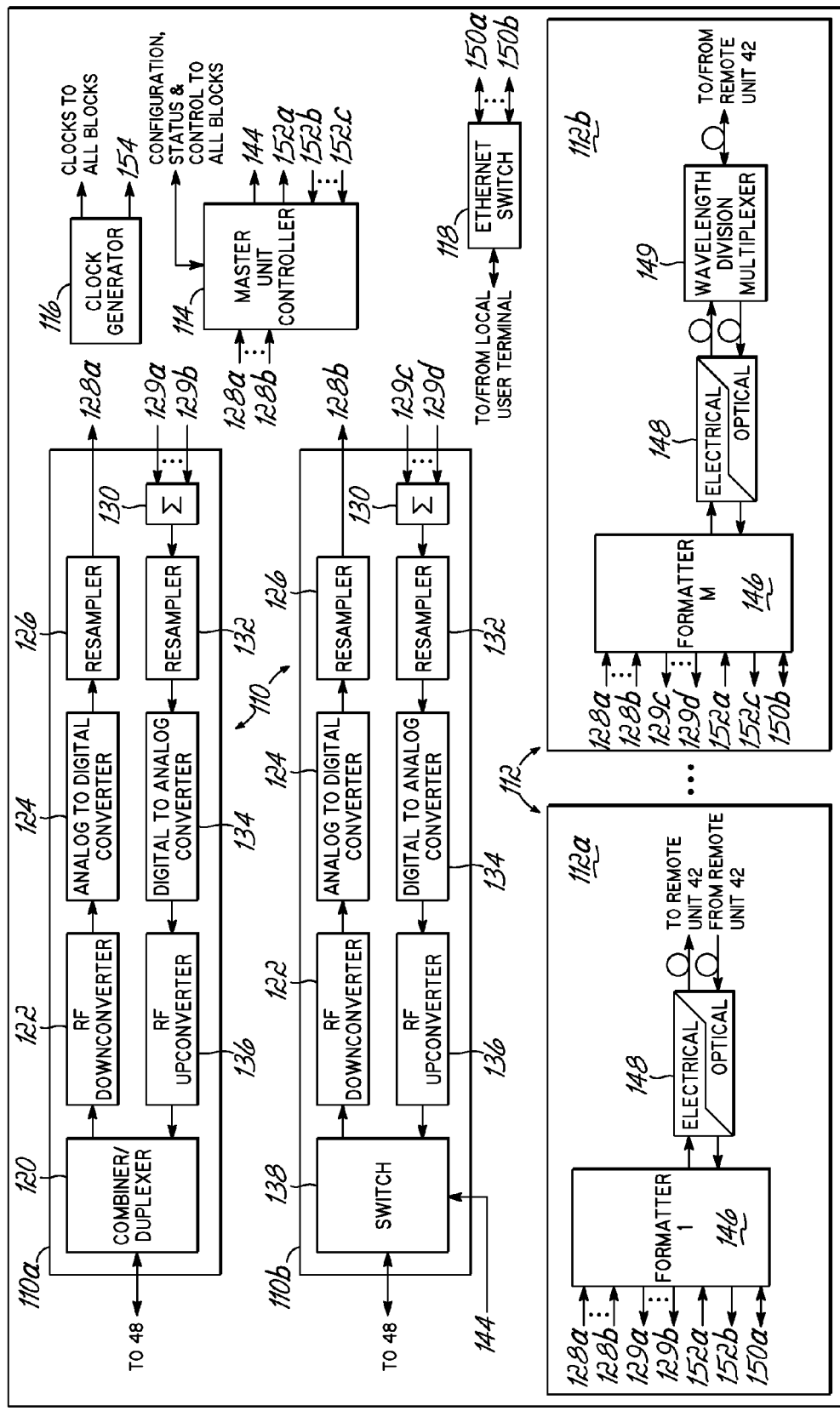
FIG. 4 is a detailed block diagram of a master unit utilized in embodiments of the invention.
Figure 5A:
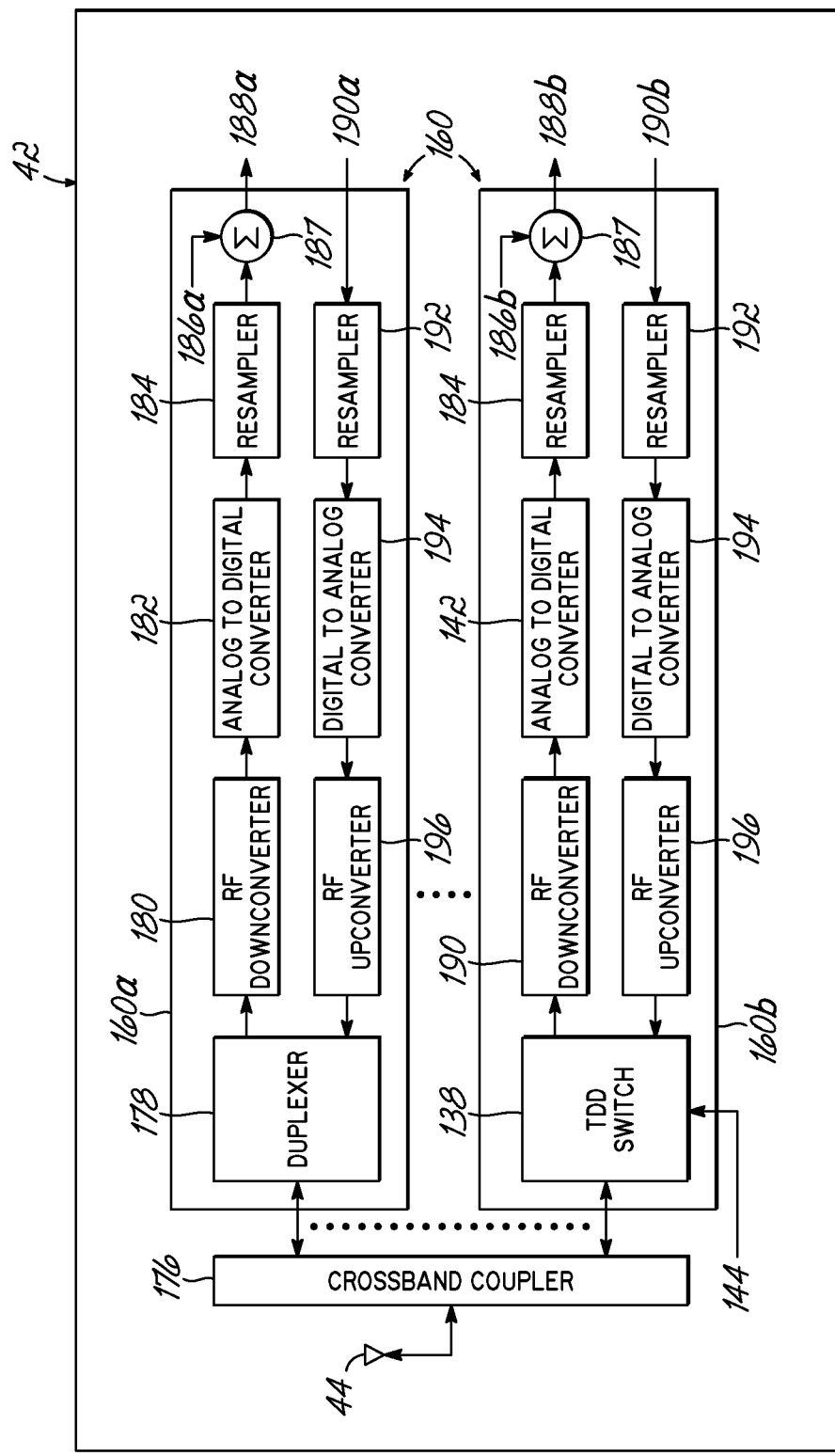
FIGS. 5A and 5B are a detailed block diagram of a portion of a remote unit utilized in embodiments of the invention.
Figure 5B:
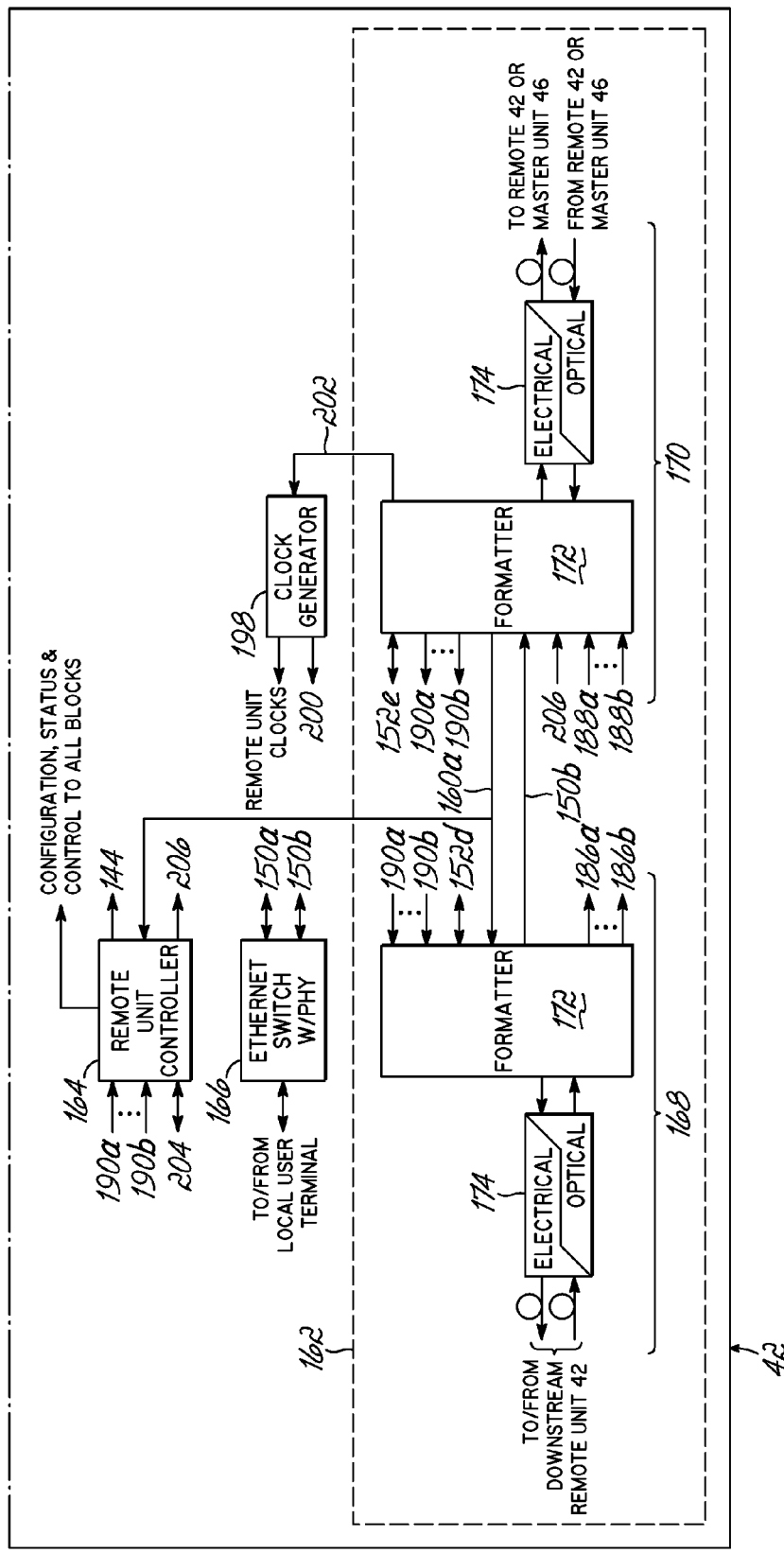
Figure 6:
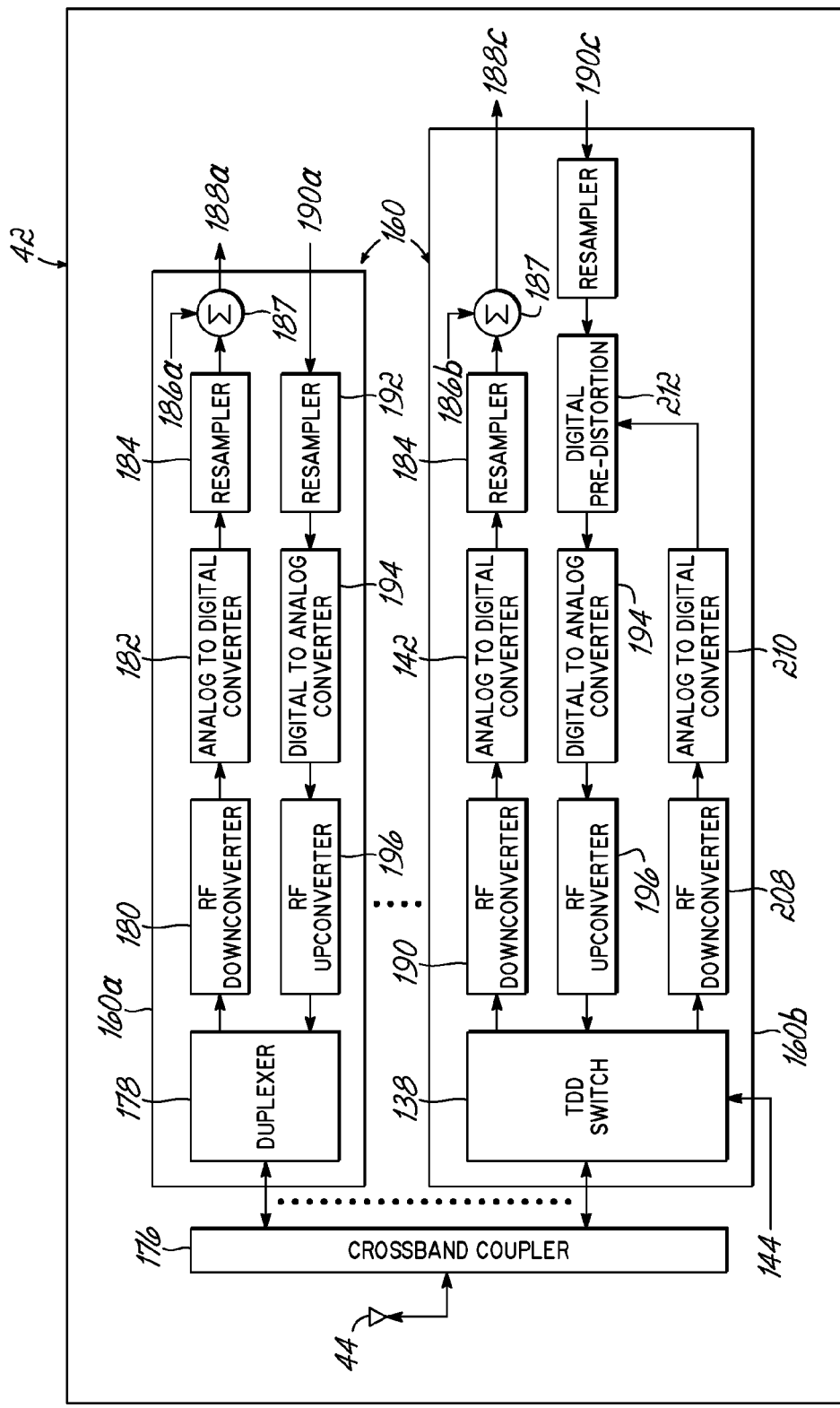
FIG. 6 is a detailed block diagram of an alternate portion of a remote unit utilized in embodiments of the invention.

FIGS. 4-6 illustrates an exemplary distributed antenna system for implementing embodiments of the invention. Focusing now on a master unit 46, FIG. 4 contains a detailed block diagram of the master unit 46. Each master unit 46 may contain from one to six radio channels (hereinafter referred to as a "path") 110, from one to four digitally modulated optical channels 112, a controller 114, a clock generator 116, and an Ethernet switch 118.

In one embodiment, each path, such as 110*a*, may be configured to handle a signal to and from SISO BTSs 54*a-b* and/or MIMO BTS 58, for example. For a FDD air interface, the paths 110*a* employ a combiner and a duplexer 120 to handle the uplink signal and the downlink signal. An RF downconverter 122 may amplify the received signal from the combiner/duplexer 120 to ensure that an A/D converter 124 is fully loaded. The RF downconverter 122 sets a center frequency of a band within the A/D converter pass band. The wideband ND 124 digitizes the entire downlink band of the air interface to ensure all downlink channels are digitized. A resampler 126 converts the signal to a complex format, digitally downconverts the frequency band in some cases, decimates and filters the signal, and resamples it. This reduces the amount of data associated with a downlink signal, such as 128a, that has to be transferred over the optical lines and synchronizes the rate of the digitized data to the optical network bit rate.

The uplink section of the radio channel 110a sums 120 the uplink signals, such as signals 129a-d, for its assigned band from remote units 42 coupled to the master unit 46 after they are converted to an electrical signal. The summation 130 is resampled, interpolated to change to a different data rate in some cases, and upconverted by the resampler 132 and then converted to an analog form by the D/A converter 134. The RF upconverter 136 translates the center frequency of the analog signal to the appropriate frequency for the air interface and amplifies it. The amplified signal is applied to the combiner/duplexer 120 and is routed back to the SISO BTSs 54a-b and/or MIMO BTS 58.

In embodiments utilizing TDD air interfaces, the combiner and duplexer are replaced by a switching function 138 shown in FIG. 4 for example in radio channel 110b and detailed in FIG. 5. While the master unit 46 is receiving the downlink signal, a RF amplifier in the RF upconverter is disabled and a shunt switch in the switching function 138 may shunt the RF amplifier to ground to further reduce leakage. During intervals when the master unit 46 is sending the uplink signal to the base station 42, the RF amplifier is enabled, the shunt switch is opened and a series switch in the switching function 138 may be opened to protect the RF downconverter from damage due to high power levels. The switch control timing 144 is determined by a master unit controller 114 from the downlink signal 128b. Additionally, a formatter 146 may apply a data compression to reduce the redundant digital information included in the serial data stream before it is sent to the transmitter in an electro-optical transceiver 148. The compression may allow for saving bandwidth or for using a less costly transceiver with lower bit rate. The compressed serial data may be converted into an uncompressed data stream after being received on the opposite ends in the optical received of 148 by the receiver side formatter 146.

Each digitally modulated optical channel 112a-b is composed of a formatter 146 and an electro-optical transceiver 148. On the outgoing side, the formatter 146 blocks, into time division multiplexed frames, the digitized downlink signal 128a-b along with a customer Ethernet in Reduced Media Independent Interface ("RMII") format 150a-b, operation and maintenance ("O&M") data 152 a-c and synchronization information. In other embodiments, other interfaces such as MII, RMII, GMII, SGMII, XGMII, among others may be used in place of the RMII interface. The framed data may be randomized by exclusive or'ing (XOR) it with the output of a linear feedback shift register to remove long strings of logic ones or zeros. Other known coding formats such as 8 bit/10 bit or 64 bit/66 bit coding may also be used, but may result in a decrease in efficiency in the use of the digital serial link. This digital data is then converted to a serial stream which is used to modulate an optical transmitter within the electro-optical transceiver 148. In a single fiber implementation, a wavelength division multiplexer ("WDM") 149 may be employed to combine or split the two optical signals.

For incoming signals from the remote units 44, the electro-optical transceiver 148 converts the optical signal to an electrical signal. The formatter 146 phaselocks to the incoming bit stream and generates a bit clock that is phase-locked to the data rate and aligned with the serial data stream. The formatter 146 then converts the serial stream to a parallel digital data stream, de-randomizes it and performs frame synchronization. It then breaks out the digitized uplink signal for each band, buffers each band and routes the bands to the appropriate radio channel 110a, 110b, if necessary. Finally, the formatter 146 breaks out the buffers and O&M Ethernet data 152a-c and the user Ethernet data 150a-b and routes them to the controller 114 and the Ethernet switch 118, respectively.

The master unit controller 114 uses locally stored information and information from the O&M Ethernet data to configure and control the other blocks in the master unit 46. It also passes this information to the remote units 42 and reports status of the remote units 42 and the master unit 46 to the system controller 76. When a radio channel, such as 110b, is assigned to a TDD air interface, the master unit controller 114 also uses the corresponding downlink signal 128b to derive TDD switch control timing 144.

The system controller 76 generally has overall system control. The master unit controller 114 functions to configure individual modules as well as supervise individual modules. As part of the configuration and supervision functions, the master unit controller 114 is operable to determine the uplink/downlink switch timing in TDD systems by decoding the downlink signaling or acquiring it from a different source such as the time variant UL RSSI, or some base station clock signal provided from an external source. The downlink frame clock in TDMA systems may be determined and distributed by decoding the downlink signaling to allow time slot based functions such as uplink or downlink muting, uplink or downlink Received Signal Strength Indication ("RSSI") measurements within time slots, uplink and downlink traffic analysis, etc. The master unit controller 114 may detect active channels in the RF spectrum to assist in or automatically configure the filter configuration in the resampler 126, 132. Optimal leveling of the individual signals in the resampler may also be determined by measurement of the RSSI of the various signals in the downlink RF band. A remote unit controller may perform similar tasks in the uplink of the remote unit 42.

The clock generator 116 may use a stable temperature compensated voltage controlled crystal ("TCVXO") to generate stable clocks and reference signals 154 for master unit 46 functional blocks. Although, one of ordinary skill in the art will appreciate that other devices or crystals may also be used to generate clocking signals as long as they are capable of producing the stable clocks required by the system.

Focusing now on a remote unit 42, FIG. 5A and FIG. 5B contain a detailed block diagram of a remote unit 42 consistent with embodiments of the invention. Each unit 44 may contain from one to six radio channels 160, one or two DMOCs 162, a remote unit controller 164 and an Ethernet switch 166.

The DMOCs 162 may be designated as the downstream 168 and upstream channels 170. The downstream channel 168 is connected to a remote unit 42 that precedes this remote unit 42 in a daisy chain, if so configured. The upstream channel 170 is connected to a master unit 46 or another remote unit 42. The DMOC 162 functional blocks are similar to those in the master unit 46. Both consist of a formatter 172 and electro-optical transceiver 174. Outgoing data is buffered, formatted into frames, randomized, parallel to serial converted and used to modulate an optical transmitter in the electro-optical transceiver 174. Incoming data is converted from an optical to electrical format, bit synchronized, de-randomized, frame synchronized and converted to a parallel format. The various data types are then broken out buffered and distributed to other function blocks within the remote unit 42. In some embodiments, formatter 172 may implement compression and decompression schemes to reduce bandwidth over the digital optical link.

Radio channels in the remote unit 42 are functionally similar to those in the master unit 46. Each radio channel is configured to handle a single RF band. Unlike the master unit 46 radio channels 110, the remote unit 42 radio channels 160 are connected via a cross band coupler 176 to its antenna 44. For FDD air interfaces, the radio channels, such as radio channel 160a, employ a duplexer 178 to split the uplink and the downlink signal. Duplexers, cross-band combiners and couplers may be optional for some embodiments of either the master unit 46 or remote units 42. In these embodiments, additional antennas may replace the duplexer 178 and cross-coupler 176 in the remote units 42. Extra cables would be required in the master unit 46. A RF downconverter 180 amplifies the received uplink signal from the antenna 44 to ensure an A/D converter 182 is fully loaded and sets the center frequency of the band within the A/D converter pass band. The wideband A/D 182 digitizes the entire uplink band of the air interface to ensure all uplink channels are digitized. A resampler 184 converts the uplink signal to a complex format, digitally downconverts the signal in some cases, decimates and filters the signal, and resamples it with a multi-rate filter bank. This reduces the amount of data that has to be transferred over the optical links and synchronizes the rate of the digitized data to the optical network bit rate. The output of the resampler 184 is added to the uplink signals 186a from the downstream remote units 42 in summer 187. The summed uplink signal 188a for each band is then sent to a formatter 172 in the upstream channel 170 in the DMOC 162.

The downlink signal 190 for each band (190a, 190b) is interpolated and frequency shifted in the resampler 192. The group delay of individual spectral components can be adjusted via filters or delay elements in the resampler 192. The signal is then converted to an analog form by the D/A converter 194. The RF upconverter 196 translates the center frequency of the analog downlink band to the appropriate frequency for the air interface and amplifies it. The amplified signal is then applied to the antenna 44 and transmitted to a wireless unit 90.

For TDD air interfaces, the duplexer 178 is replaced by the switching function 138 shown in radio channel 160b and FIG. 5A. While the remote unit 42 is receiving the uplink, the RF power amplifier in the RF upconverter 196 is disabled and a shunt switch in the switching function 138 shunts the RF power amplifier to ground to further reduce leakage. When the remote unit 42 is transmitting the downlink signal, the RF power amplifier is enabled, the shunt switch is opened to permit the downlink signal to reach the antenna 44 and a series switch in the switching function 138 is opened to protect the RF downconverter 180 from damage due to high power levels. As with the master unit 46, the switch control timing 144 is determined by the controller 164 from the downlink signal 190a, 190b.

The clock generator 198 includes a voltage-controlled crystal oscillator ("VCXO") that is phaselocked to the incoming serial data stream bit rate via a narrowband phaselocked loop ("PLL"). The VCXO output is split and is used as the frequency reference 200 for the local oscillators in each radio channel 160a-b, the sampling clocks for the A/D 182 and D/A 194 converters, and a clock for the other blocks in the remote unit 42. One of ordinary skill in the art will realize that the long term frequency accuracy should be good to ensure the local oscillators are on frequency and that the short term jitter levels should also be low to ensure that the jitter does not corrupt the A/D and D/A conversion processes. By phaselocking to the data rate of the optical link, which is derived from the stable TCVCXO in the master unit 46, the remote unit 42 does not require an expensive oven compensated oscillator or a GPS disciplining scheme to maintain long term frequency accuracy, thereby, making the more numerous remote units 42 less expensive. The use of a narrow band PLL and a crystal controlled oscillator may assist in reducing short term jitter for the A/D and D/A converter clocks. Using the recovered, jitter reduced clocks 202 to re-clock the transmit data in the optical links at each remote unit 42 reduces jitter accumulation which may assist in improving A/D and D/A converter clocks in the downstream remote units 42 and may assist in reducing the bit error rate ("BER") of the optical communication channels 162.

The remote unit controller ("RUC") 164 uses locally stored information and information from the O&M Ethernet to configure and control the other blocks in the remote unit 42. Downstream RMII 152d and upstream RMII 152e may also be supplied to the formatter 172. In addition, local O&M data 206 may be configured at a local O&M terminal 204. Remote unit 42 also passes this information to the up and downstream remote units 42 and/or master unit 46. The RUC 164 additionally uses the appropriate downlink signal to derive TDD switch control timing 144 when required.

In an alternate embodiment of the radio channel 160c utilized in a remote unit 42, the radio channel 160c may also employ digital pre-distortion to linearize the power amplifier. This embodiment of the radio channel 160c in a remote unit 42 is shown in the block diagrams of FIG. 6. In this embodiment, a third signal path may be added to one or more radio channels 160c. The third path couples off the downlink signal after power amplification and digitizes it. The signal from the antenna 44 is received in an RF downconverter 208, which amplifies the received signal to ensure an A/D converter 210 is fully loaded and sets the center frequency of the band within the A/D converter pass band. The wideband A/D 210 digitizes the entire uplink band of the air interface to ensure all uplink channels are digitized. The digitized signal is compared to a delayed version of the downlink signal in the digital pre-distortion unit 212 and the difference is used to adaptively adjust the gain and the phase of the signal prior to D/A conversion to correct for non-linearity in the power amplifier.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. For example, a distributed antenna system consistent with embodiments of the invention may have more or fewer remote units 42, master units 46, summing circuits 48, RF combination networks 50, hybrid couplers 52, SISO BTSs 54, MIMO BTSs 58 and/or system controllers 76 than those illustrated. In particular, each MIMO BTS 58 may include more or fewer output ports 62 and/or 64.

Additionally, each master unit 46 may be connected to more or fewer remote units 42 than those illustrated. As such, a plurality of remote units 42 may be connected to each master unit 46 through two links and/or along a single link. Alternatively, each remote unit 42 may be connected to a master unit 46 through a dedicated link. In some embodiments, up to six remote units 42 may be connected in series from a master unit 46. As such, remote units 42 may be positioned to optimize coverage within a coverage area.

Furthermore, system 40 and/or 100 may not include summing circuits 48a-48b. As such, the master unit 46a may combine the combined SISO BTS signal 56a and first output signal 68, while the master unit 46b may combine the combined SISO BTS signal 56b and second output signal 70. Additionally, the system 40 may also not include RF combination network 50. As such, the master unit 46a may combine one or more signals from the SISO BTSs 54 and the first output signal 68, while the master unit 46b may combine one or more signals from the SISO BTSs 54 and the second output signal 70.

Moreover, and in some embodiments, the master unit controller 114 may measure a pilot signal strength of CDMA or Orthogonal Frequency-Division Multiplexing ("OFDM") signals to properly set the level of the downlink signals, as the RSSI can vary at different capacity loading. The pilot signals generally remain constant with a configured ratio between pilot level and a maximum composite for full loading, the required headroom for the signals may be maintained. The master unit controller 114 may also measure and supervise the signal quality of the provided downlink channels. In case of signal degradation, an alarm may be set and the operator can focus on a base station (e.g., SISO or MIMO BTS) without having to troubleshoot the entire system 40 and/or 100.

In some embodiments, the master unit controller 114 determines the amount of channels for a narrowband base station standard such as Global System for Mobile communications ("GSM"). Together with the measurement of the Broadcast Control Channel ("BCCH"), which is constant in power, the proper headroom that is required for a multichannel subband may be determined and overdrive or underdrive conditions may be avoided. In other embodiments, the master unit controller 114 monitors the crest factor of a transmitted spectrum in the presence of multiple channels. The crest factor may provide input to the leveling of the transmit power or the power back-off of particular gain stages of the system. The configured headroom is generally higher than the measured crest factor to avoid signal degradation due to clipping or distortion. In addition, a crest factor reduction mechanism may be employed in the resampler in some of the embodiments to reduce the crest factor and make more efficient use of the RF power amplifier in the remote unit 42 or assist in reducing the number of required bits per sample that need to be transmitted over the link.

Figure 7A:
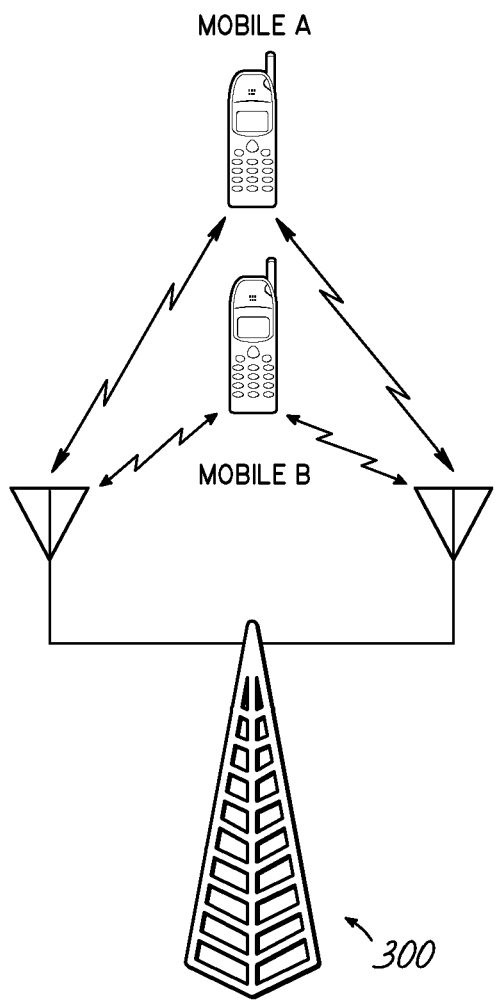
FIG. 7A is a block diagram of MIMO BTS in an outdoor scenario.
Figure 7B:
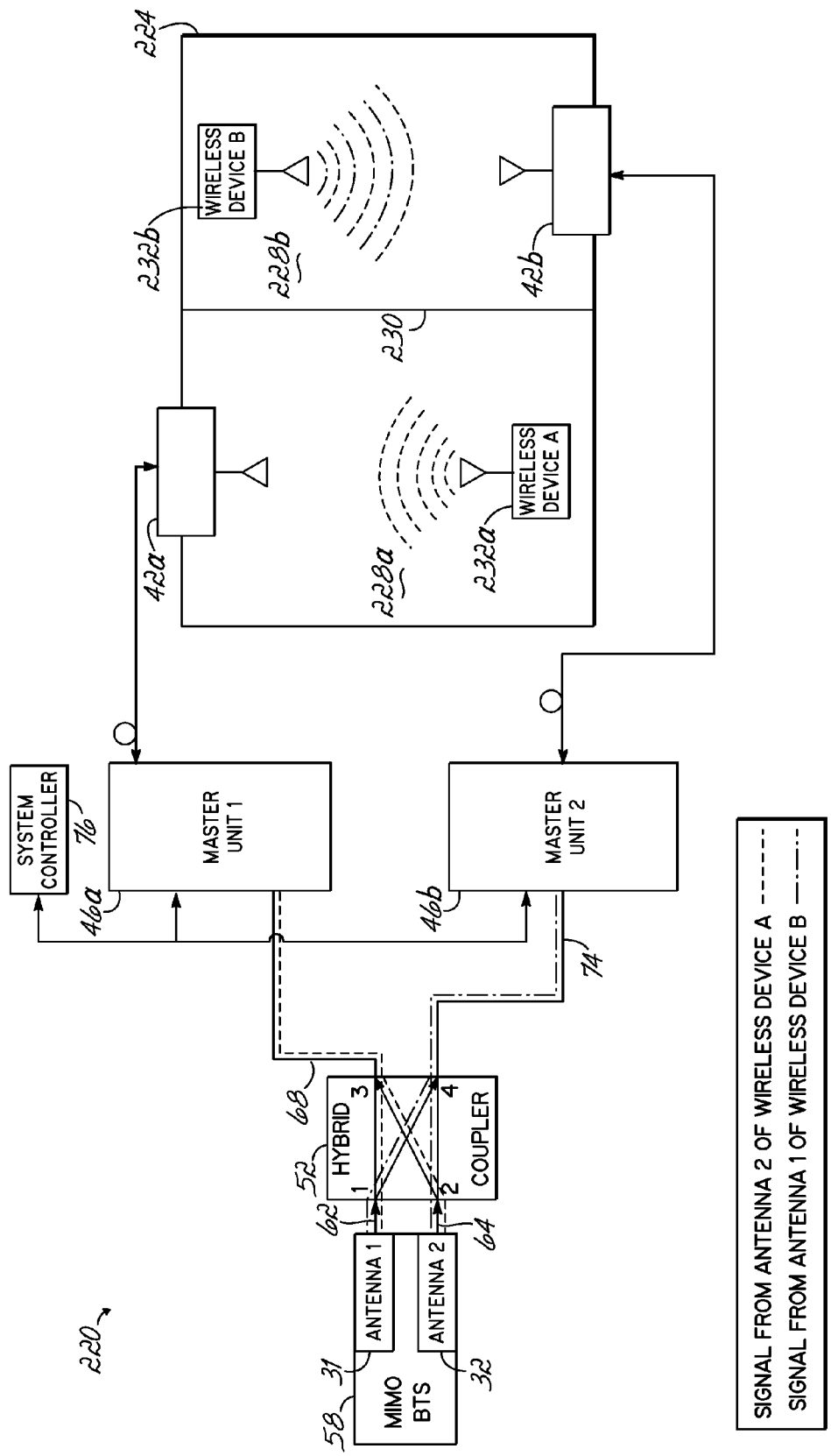
FIG. 7B is a block diagram of an alternative distributed antenna system consistent with embodiments of the invention.

As illustrated in FIGS. 7A and 7B, the invention provides benefits in regard to the Uplink path of a MIMO communication system. Both WiMAX and LTE wireless standards encompass Uplink MIMO features. In particular the "Uplink Collaborative MIMO" is implemented in Mobile WiMAX, while "Uplink Multi-User MIMO" is the term adopted in LTE for indicating the same technique. The peculiarity of this MIMO scheme is to increase the total Uplink sector capacity by reusing time/frequency resources allocated to the different UEs (User Equipments) or mobile devices, rather than to boost the data rate per single user as for Downlink Single-User MIMO (Spatial Multiplexing).

FIG. 7A shows a MIMO BTS 300 in an outdoor scenario, which can coordinate the data reception from two different mobile devices A and B, equipped with a single transmitter (Tx) antenna each, and then allocate the same time/frequency resources to them. The decoding of their respective data streams is performed by the BTS through the same signal processing as for a Single-User MIMO situation. That is, the two data streams belonging to spatially separated users, rather than to a single user with two co-located Tx antennas, are spatially multiplexed. As a consequence the saved time/frequency resources can be allocated to more users in order to increase the total Uplink sector capacity. Finally the MIMO transmission might benefit from the fact that the two transmitters are largely separated leading to a consequent increase of the probability to have uncorrelated radio channels which is one important requirement for successful MIMO operation.

FIG. 7B highlights such a potential benefit in an indoor system. FIG. 7B illustrates a schematic view of at least a portion of a wireless communication system 220 somewhat similar to the system 100 of FIG. 3, but that does not show the plurality of SISO BTSs 54a-b, the RF combination network 50, and the summing circuits 48a-b. With respect to FIG. 3, like reference numerals are utilized in FIG. 7B where applicable. The system 220 of FIG. 7 includes a plurality of master units 46a-b that provide signals to respective remote units 42a-b with a single Rx antenna each and positioned in respective portions 208a-b of an indoor environment 224. In particular the indoor environment example is illustrated as two rooms 228a-b separated by a wall 230.

As illustrated in FIG. 7B, the respective portions 228a-b of the indoor environment 224 are somewhat electromagnetically isolated (e.g., low levels of a signal sent from a wireless device 232 (device A or B) in one portion 228 detected by the remote unit 42 of another portion 228). In specific embodiments, the respective portions 228a-b are separated by the partition or wall 230. This illustration shows the case of good Uplink power isolation between the different remote unites 42a-b and the related mobile devices 232a and 232b. Therefore the Uplink multi-user MIMO feature operates desirably because at the BTS antenna ports, the mutual interference of the signals from the two devices 232a-b only depends on the isolation provided by the indoor radio planning. Although isolation will be determined by the deployment of the remote units and the location of the users and mobile devices, indoor scenarios offer good isolation due to the presence of multiple walls and floors. Also, the hybrid coupler of the invention doesn't affect the BTS MIMO decoder since the signals from the mobile devices 232a-b are orthogonally cross-coupled to the BTS antenna ports thus avoiding their mutual interference. Therefore in another aspect of the invention, with two fully isolated groups of users served by two remote units connected to different Master Units, the Uplink Multi-User MIMO feature can achieve a complete reuse of the time/frequency resources of the BTS. As a consequence the number of users manageable in the Uplink path by the MIMO BTS would be increased and possibly doubled.

It will be appreciated that such an aspect of the invention might be in contrast to the feature discussed herein of maintaining a certain degree of signal coverage overlapping between Remote Units as requested by the Downlink Single-User MIMO when implemented through DAS. Therefore, for realizing both such advantages, a tradeoff would have to be considered and managed to balance the benefits of both the MIMO features. In this context the same 90° 3 dB Hybrid Coupler can be exploited both in Downlink and in Uplink paths of an indoor DAS for MIMO signals.

Thus, each remote unit 42a-b provides signals to, and receives signals from, respective wireless devices 232a-b that are present within those respective portions 228a-b. One benefit of this arrangement as noted is that uplink collaborative MIMO (for WiMAX) and/or uplink multi-user MIMO (for LTE) may be used to increase the total uplink capacity by reusing the time and/or frequency resources associated with the different wireless devices 232a-b.

The invention in its broader aspects is not limited to the specific details representative apparatus and method, and illustrative examples shown and described. Accordingly, departures may be made from such details without departure from the spirit or scope of the applicants' general inventive concept. For example, the system 10 of FIG. 2A, the system 40 of FIG. 2B, the system 100 of FIG. 3, and/or the system 220 of FIG. 7 may be configured with an extension unit (not shown) disposed between a master unit 46 and its corresponding remote units 42. The extension unit may provide additional links for coupling a master unit 46 to additional remote units 42 and/or the extension unit may extend the range of coupling between a master unit 46 and remote units 42. Moreover, the system 10 of FIG. 2A, the system 40 of FIG. 2B, the system 100 of FIG. 3, and/or the system 220 of FIG. 7 may be configured with more or fewer remote units 12 or 42, master units 16 or 46, SISO BTSs 20 or 54, MIMO BTSs 30 or 58, system controllers 22 or 76, summing circuits 48, RF combination networks 50, and/or hybrid couplers 52, as well as support more or fewer wireless devices 26, 90, and/or 232 consistent with embodiments of the invention. Similarly, the system 10 of FIG. 2A, the system 40 of FIG. 2B, the system 100 of FIG. 3, and/or the system 220 of FIG. 7 may include a MIMO BTS 30 or 58 with more or fewer antennas 31 and/or 32, a hybrid coupler 52 with more or fewer ports, as well as a master unit 16 or 46 configured with more or fewer inputs or outputs consistent with embodiments of the invention.

Additionally, it will be appreciated that the indoor environments 104 and 224 of FIGS. 3 and 7B, respectively, are merely included to show operation of embodiments of the invention therewith, and that embodiments of the invention may be used with outdoor environments without departing from the scope of the applicants' general inventive concept. Moreover, one of ordinary skill in the art will appreciate that system 220 of FIG. 7B may include SISO BTSs 54*a-b* as well as the RF combination network 50 and summing circuits 48*a-b* consistent with alternative embodiments of the invention.

Furthermore, in some embodiments, the indoor environment 224 of FIG. 7B will be configured in other ways than just including partition 230. As such, the respective wireless devices 232*a-b* may be isolated in other ways.

Figure 10:
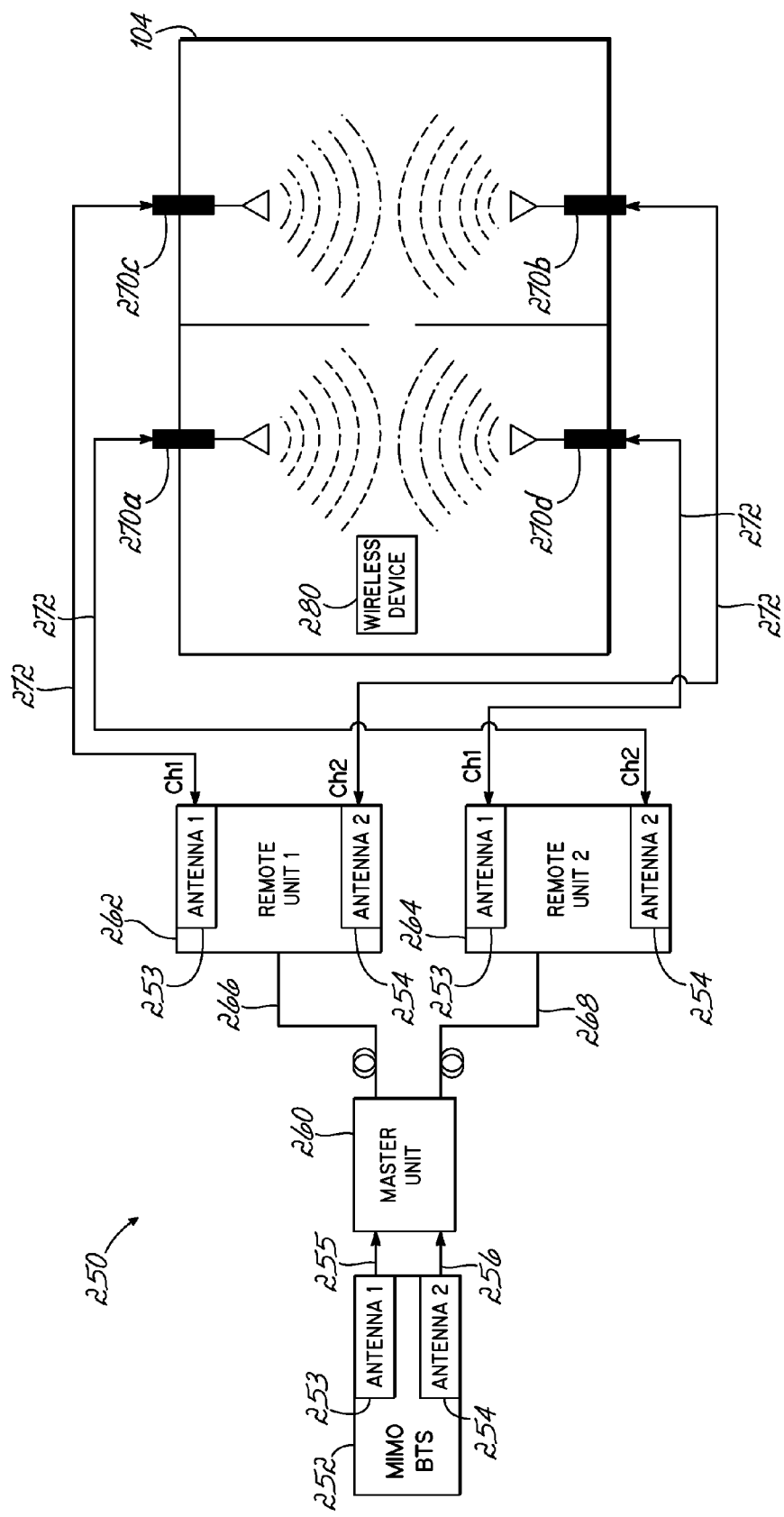
FIG. 10 is a distributed antenna system for implementing the invention.
Figure 11:
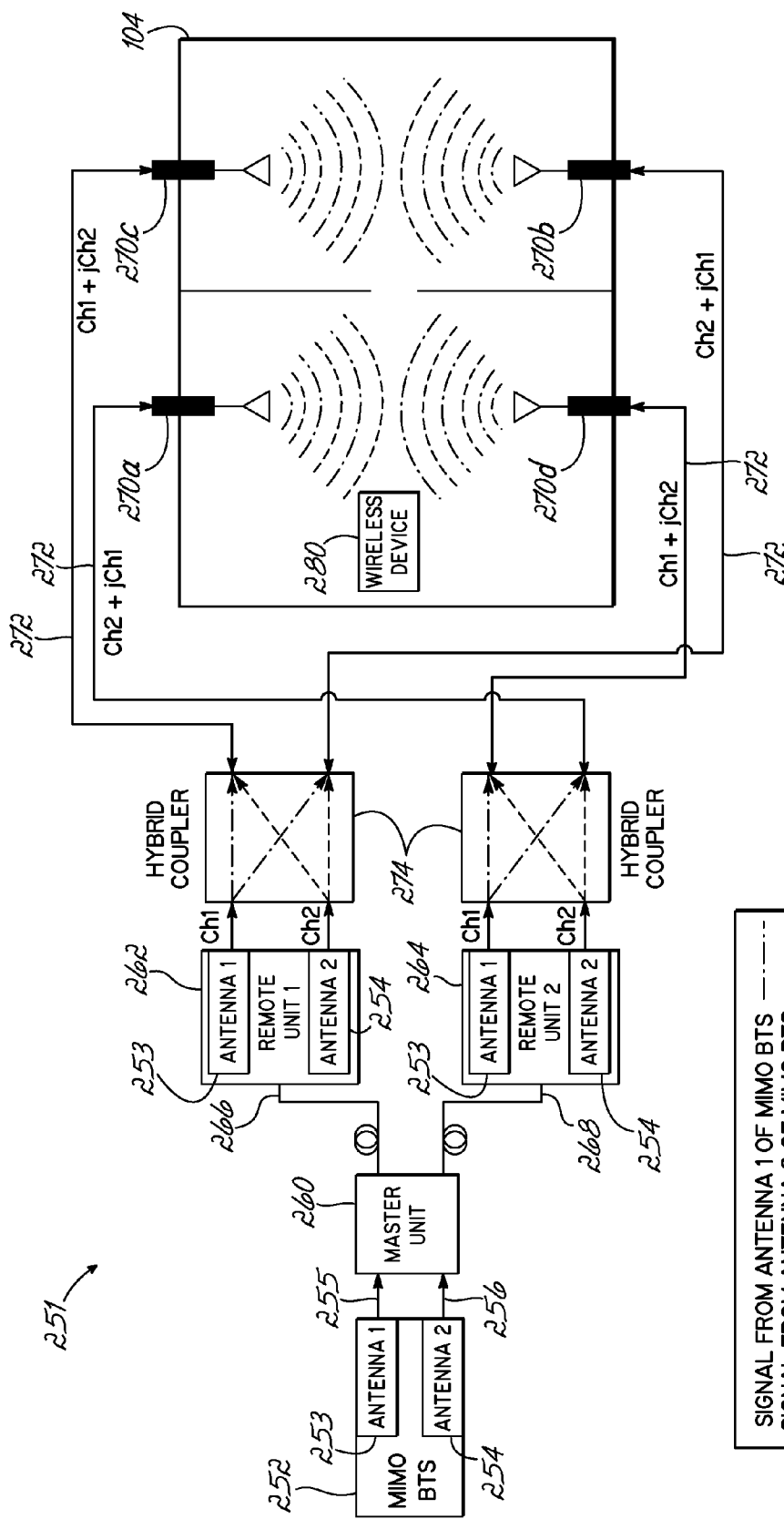
FIG. 11 is a block diagram of an alternative distributed antenna system consistent with embodiments of the invention.
Figure 12:
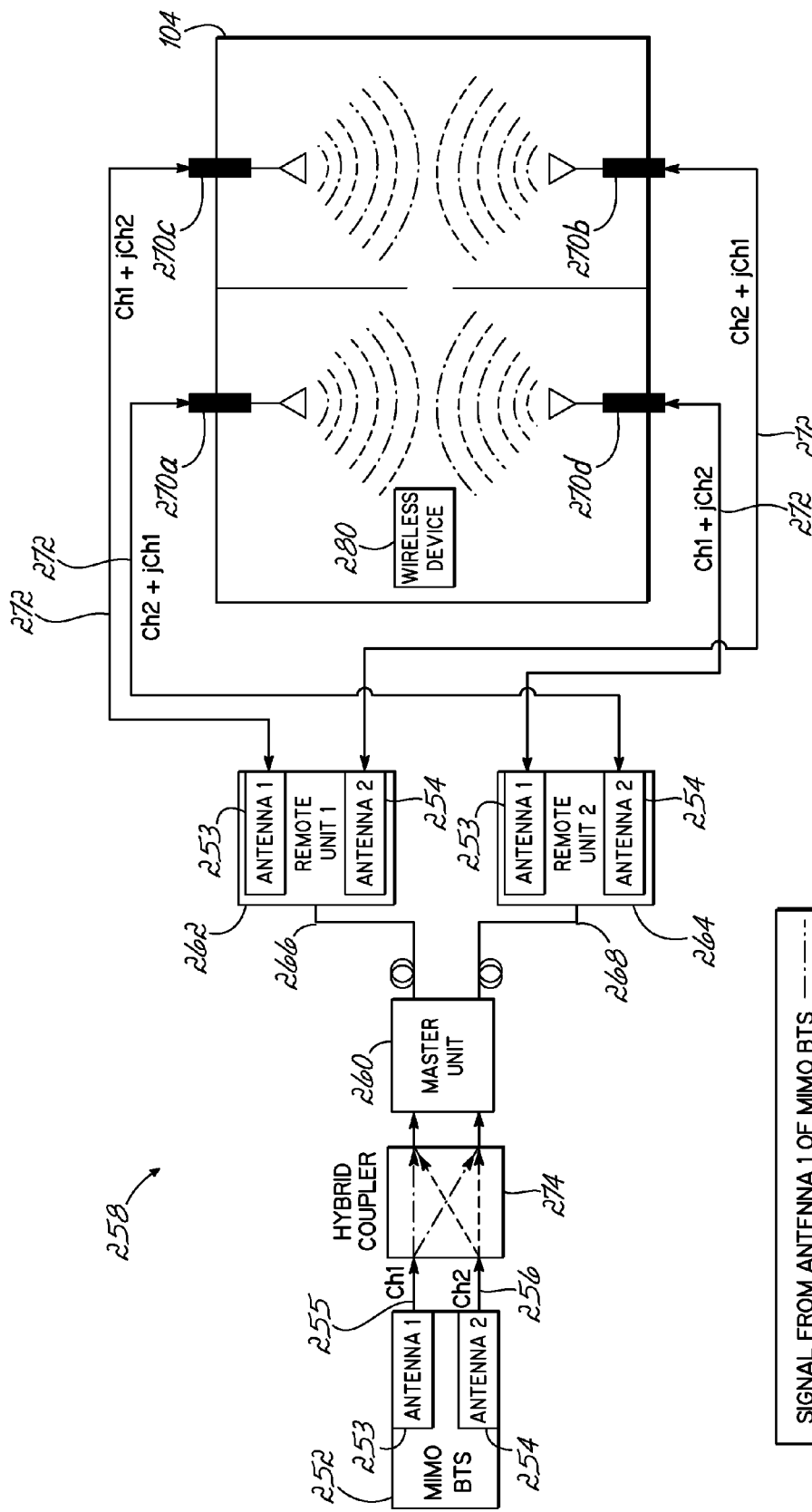
FIG. 12 is a block diagram of an alternative distributed antenna system consistent with embodiments of the invention.

FIGS. 10-12 illustrate further alternative systems for incorporating embodiments of the invention within a distributed antenna system. Specifically, system 250 illustrated in FIG. 10 is an interleaved distributed antenna system, incorporating MIMO signals, wherein the deployment of the system is implemented utilizing a combination of optical fibers, as well as an RF passive distribution network, for the purposes of signal distribution. Specifically, optical fiber is used as a link for handling traffic between the master units and remote units, while an RF distribution network is implemented between the remote units and one or more passive antennas coupled to the remote units. To that end, system 250 illustrates a particular distributed antenna system that incorporates a MIMO BTS 252 for handling signals from one or more antennas 253, 254. Such a system may take advantage of the present invention. Although the embodiments illustrated in FIGS. 10-12 incorporate two antennas and two MIMO signals (n=2), as noted herein, a MIMO system of the invention may incorporate additional antenna elements and signals as well. Therefore, the invention is not limited to the illustrated number of different MIMO antennas or MIMO channels.

The MIMO signals 255, 256, from respective MIMO antennas 253, 254 of the MIMO BTS, are delivered to master unit 260 in a suitable fashion, such as using an RF network (e.g., Coaxial cables), for distribution throughout the remote components of the system. Similarly, uplink signals from wireless devices are delivered to the MIMO BTS through the master unit 260. Although a single master unit is illustrated in the illustrated figures and discussed herein, the system 250 might utilize one or more master units.

To that end, the MIMO signals are appropriately processed and delivered to one or more remote units 262, 264 for further distribution of those signals to wireless devices and equipment, such as cellular phones. A suitable signal link, such as a fiber link 266, 268, is incorporated between the master unit 260 and the various respective remote units. The master unit 260 and remote units 262, 264 can handle the multiple MIMO signals or channels 255, 256 in an appropriate fashion over the fiber links 266, 268. For example, frequency conversion might be implemented wherein the multiple MIMO channels (two channels in the illustrated example) are converted in frequency so that their integrity is maintained over the fiber links 266, 268. Alternatively, the fiber links 266, 268 might incorporate multiple fibers wherein each fiber carriers a separate MIMO channel signal (Antenna 1/Channel 1 or Antenna 2/Channel 2) to maintain the integrity of MIMO signals between the master unit 260 and the multiple remote units 262, 264. In still another embodiment, wavelength division multiplexing (WDM) might be implemented on the fiber links 266, 268 between the master and remote units to maintain the integrity of the MIMO channels.

In the system 250 illustrated in FIG. 10, the various signals, including the MIMO signals, are then passively distributed from the remote units in an RF distribution network out to passive antenna elements 270*a*-270*d*. For example, the remote units 262, 264 might be coupled to the antennas 270*a*-270*d* through suitable RF links, which might implement RF cables, such as coaxial cables, and suitable power splitters for delivering the signals to multiple passive antennas 270*a*-270*d*. In the system 250, the MIMO channels are still segregated, and thus, each particular antenna unit 270*a*-270*d* would only handle one of the MIMO channels.

Referring now to FIG. 11, in accordance with one embodiment of the invention, a hybrid coupler circuit is implemented in the system 251. Specifically, a hybrid coupler circuit is implemented between each of the remote units 262 and 264 and the respective passive antennas 270*a*-270*d*. As illustrated in FIG. 11, the hybrid coupler circuits 274, which may be 90°, 3 dB hybrid RF couplers as discussed herein, are shown situated between the various remote units and antennas. As illustrated in FIG. 11, each antenna 270*a*-270*d* then handles a portion of each of the MIMO signals in accordance with the invention for communication with a wireless device, such as wireless device 280.

As discussed above, the hybrid coupler circuits are configured to receive the first MIMO signal (Antenna 1/Channel 1) and the second MIMO signal (Antenna 2/Channel 2) from the respective remote unit at respective first and second ports. Output signals are then provided at output ports of the couplers, and the output signals include portions of the first and second MIMO signals. The output signals, with the combined MIMO signal portions, are then delivered to the various antenna elements 270*a* and 270*d* and broadcast appropriately to wireless devices in the signal vicinity. In that way, each antenna in the indoor environment handles both or all MIMO channels as illustrated.

FIG. 12 illustrates another alternative embodiment of the invention, wherein a hybrid coupler circuit 274 is implemented within an optical fiber and RF distribution system 258, similar to that as illustrated in FIG. 10. Rather than incorporating a hybrid coupler circuit with each of the remote units, a hybrid coupler circuit 274 is incorporated between the MIMO BTS 252 and the master unit 260. The coupler circuit combines the multiple MIMO channels on output ports as discussed and the various output ports are coupled with the master unit 260. The combined MIMO signals at the master unit are then appropriately directed to the remote units 262, 264 utilizing fiber, and then further distributed through an RF link or passive distribution network to the antennas 270a-270d, as discussed above. Similar to the embodiment in FIG. 11, each antenna in the indoor environment handles both or all MIMO channels as illustrated.

Other modifications will be apparent to one of ordinary skill in the art. Therefore, the invention lies in the claims hereinafter appended. Furthermore, while embodiments of the invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A distributed antenna system comprising:
   at least one master unit within the distributed antenna system;
   a plurality of remote units within the distributed antenna system, the plurality of remote units distributed to provide coverage within a service area, each of the plurality of remote units remotely located from each other and the at least one master unit, the plurality of remote units coupled with the at least one master unit;
   at least one antenna coupled with each of the remote units;
   a coupler element coupled to receive a plurality of multiple-input and multiple-output (MIMO) signals, including at least first and second MIMO signals of the plurality of MIMO signals, the coupler element configured for introducing a phase shift in a portion of at least the first MIMO signal and for combining the phase shifted first MIMO signal portion with a portion of the second MIMO signal and presenting the combined first and second MIMO signal portions at a first output port of the coupler element;
   at least one antenna coupled for receiving the combined first and second MIMO signal portions of the first output port for transmission.

2. The distributed antenna system of claim 1, wherein the coupler element is configured for introducing a phase shift in a portion of at least the second MIMO signal and for combining the phase shifted second MIMO signal portion with a portion of the first MIMO signal and presenting those combined first and second MIMO signal portions at a second output port of the coupler element, at least one antenna being coupled for receiving the combined first and second signal portions of the second output port for transmission.

3. The distributed antenna system of claim 1, wherein the coupler element first output port is coupled with the at least one master unit for presenting the combined first and second MIMO signal portions to the master unit for distribution to the at least one antenna.

4. The distributed antenna system of claim 3, wherein the at least one master unit is a MIMO master unit.

5. The distributed antenna system of claim 3, wherein the at least one master unit is a single-input and single-output (SISO) master unit.

6. The distributed antenna system of claim 2, wherein the coupler element first and second output ports are coupled with the at least one master unit for presenting the combined first and second MIMO signal portions of the first and second output ports to the master unit for distribution to antennas for transmission.

7. The distributed antenna system of claim 6, wherein the at least one master unit is a MIMO master unit.

8. The distributed antenna system of claim 2, wherein signals of the first output port are coupled with a master unit and the signals of the second output port are coupled with a master unit, the master units coupled with a plurality of single-input and single-output (SISO) remote units and configured for directing the combined MIMO signal portions of the first output port to at least one SISO remote unit and for directing the combined first and second MIMO signal portions of the second output port to another SISO remote unit.

9. The distributed antenna system of claim 7, wherein the MIMO master unit is coupled with a plurality of MIMO remote units each coupled with a plurality of antennas, the MIMO master unit configured for directing the combined first and second MIMO signal portions of both the first and second output ports to a MIMO remote unit, the MIMO remote unit directing the combined first and second MIMO signal portions of the first output port to one antenna and the combined first and second MIMO signal portions of the second port to another antenna.

10. The distributed antenna system of claim 1, wherein the master unit is configured for coupling with a source of MIMO signals and for directing the MIMO signals to the remote units and antennas, the coupler element being coupled between the remote unit and a respective antenna for presenting the combined first and second MIMO signal portions from the first outlet port to the antenna.

11. The distributed antenna system of claim 2, wherein at least one of the plurality of remote units is a MIMO remote unit with a plurality of antennas, the master unit configured for coupling with a source of MIMO signals for directing MIMO signals to the MIMO remote unit and antennas, the coupler element being coupled between the MIMO remote unit and respective antennas and presenting the combined first and second MIMO signal portions from the first outlet port to one antenna and presenting the combined first and second MIMO signal portions from the second outlet port to another antenna.

12. The distributed antenna system of claim 1, wherein the remote unit is coupled with the master unit over at least one of an optical link or and RF link.

13. The distributed antenna system of claim 1, wherein the coupler element is a 90° 3 dB hybrid coupler.

14. The distributed antenna system of claim 1, wherein the coupler element introduces an orthogonal phase shift to a portion of the MIMO signal.

15. A distributed antenna system comprising:
   at least one master unit within the distributed antenna system;
   a plurality of remote units within the distributed antenna system, the plurality of remote units distributed to provide coverage within a service area, each of the plurality of remote units remotely located from each other and the at least one master unit, the plurality of remote units coupled with the at least one master unit;

at least one antenna coupled with each of the remote units for transmission of signals from the remote unit;

a coupler element operatively coupled with the master unit and configured to receive, from a signal source, a plurality of multiple-input and multiple-output (MIMO) signals including at least first and second MIMO signals of the plurality of MIMO signals MIMO signals, the coupler element configured for introducing a phase shift in a portion of at least the first MIMO signal and for combining the phase shifted first MIMO signal portion with a portion of the second MIMO signal and presenting the combined first and second MIMO signal portions at a first output port of the coupler element;

the master unit configured for receiving the combined first and second MIMO signal portions from the first output port;

the remote units receiving the combined MIMO signal portions of the first output port from the master unit for transmission.

16. The distributed antenna system of claim 15, wherein the coupler element is configured for introducing a phase shift in a portion of at least the second MIMO signal and for combining the phase shifted second MIMO signal portion with a portion of the first MIMO signal and presenting those combined first and second MIMO signal portions at a second output port of the coupler element, the master unit configured for receiving the combined first and second MIMO signal portions from both the first and second output ports, the remote units and respective antennas receiving the combined first and second MIMO signal portions of the first and second output ports from the master unit for transmission.

17. The distributed antenna system of claim 15, wherein the remote units are SISO remote units, some of the SISO remote units receiving the combined MIMO signal portions of the first output port.

18. The distributed antenna system of claim 16 wherein the remote units are MIMO remote units, the MIMO remote units receiving the combined MIMO signal portions of both the first output port and the second output port.

19. A distributed antenna system comprising:
at least one master unit within the distributed antenna system, the at least one master unit coupled to receive a plurality of multiple-input and multiple-output (MIMO) signals including at least first and second MIMO signals of the plurality of MIMO signals;

a plurality of MIMO remote units within the distributed antenna system, the plurality of MIMO remote units distributed to provide coverage within a service area, each of the plurality of MIMO remote units remotely located from each other and the at least one master unit, the plurality of MIMO remote units coupled with the at least one master unit for receiving the MIMO signals;

a plurality of antennas coupled with each of the MIMO remote units;

a coupler element operatively coupled between a MIMO remote unit and respective antennas, the coupler element configured for introducing a phase shift in a portion of at least the first MIMO signal and for combining the phase shifted first MIMO signal portion with a portion of the second MIMO signal and presenting the combined first and second MIMO signal portions at a first output port of the coupler element, and configured for introducing a phase shift in a portion of at least the second MIMO signal and for combining the phase shifted second MIMO signal portion with a portion of the first MIMO signal and presenting those combined first and second MIMO signal portions at a second output port of the coupler element;

the MIMO remote units receiving the combined first and second MIMO signal portions of the first and second output port from the master unit for transmission.

20. The distributed antenna system of 1, wherein the plurality of remote units are coupled with the at least one master unit via optical fibers.

21. The distributed antenna system of 15, wherein the plurality of remote units are coupled with the at least one master unit via optical fibers.

22. The distributed antenna system of 19, wherein the plurality of MIMO remote units are remotely located from the at least one master unit via optical fibers.

* * * * *